(12) United States Patent
Meuler et al.

(10) Patent No.: US 10,378,813 B2
(45) Date of Patent: Aug. 13, 2019

(54) FLUID CONTROL FILMS WITH HYDROPHILIC SURFACES, METHODS OF MAKING SAME, AND PROCESSES FOR CLEANING STRUCTURED SURFACES

(71) Applicant: 3M INNOVATIVE PROPERTIES COMPANY, St. Paul, MN (US)

(72) Inventors: Adam J. Meuler, Woodbury, MN (US); Susannah C. Clear, Hastings, MN (US); Steven P. Swanson, Blaine, MN (US); Kurt J. Halverson, Lake Elmo, MN (US); Justin A. Riddle, St. Paul, MN (US); Paul B. Armstrong, Minneapolis, MN (US); Caleb T. Nelson, Woodbury, MN (US); Chetan P. Jariwala, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 166 days.

(21) Appl. No.: 15/305,524

(22) PCT Filed: Apr. 22, 2015

(86) PCT No.: PCT/US2015/027025
§ 371 (c)(1),
(2) Date: Oct. 20, 2016

(87) PCT Pub. No.: WO2015/164468
PCT Pub. Date: Oct. 29, 2015

(65) Prior Publication Data
US 2017/0045284 A1    Feb. 16, 2017

Related U.S. Application Data

(60) Provisional application No. 61/983,585, filed on Apr. 24, 2014, provisional application No. 62/150,498, filed on Apr. 21, 2015.

(51) Int. Cl.
*F25D 21/14* (2006.01)
*C08J 5/18* (2006.01)
(Continued)

(52) U.S. Cl.
CPC .............. *F25D 21/14* (2013.01); *B08B 1/006* (2013.01); *B08B 3/10* (2013.01); *B32B 7/06* (2013.01);
(Continued)

(58) Field of Classification Search
CPC .... B32B 3/30; B32B 7/06; B32B 7/12; Y10T 428/2457; Y10T 428/24579;
(Continued)

(56) References Cited

U.S. PATENT DOCUMENTS 4,152,165 A    5/1979   Langager
4,235,638 A    11/1980   Beck
(Continued)

FOREIGN PATENT DOCUMENTS

WO    WO 2007-146680    12/2007
WO    WO 2009-119690    10/2009
(Continued)

OTHER PUBLICATIONS

EAST Search related to "capillary rise percent" (Year: 2018).*
(Continued)

*Primary Examiner* — Donald J Loney
(74) *Attorney, Agent, or Firm* — Julie Lapos-Kuchar; Adrian L. Pishko

(57) ABSTRACT

A fluid control film is provided that includes fluid control channels extending along a channel longitudinal axis. Each of the fluid control channels has a surface and is configured to allow capillary movement of liquid in the channels. The fluid control film further includes a hydrophilic surface treatment covalently bonded to at least a portion of the
(Continued)

surface of the fluid control channels. The fluid control film exhibits a capillary rise percent recovery of at least ten percent. Typically, the hydrophilic surface treatment includes functional groups selected from a non-zwitterionic sulfonate, a non-zwitterionic carboxylate, a zwitterionic sulfonate, a zwitterionic carboxylate, a zwitterionic phosphate, a zwitterionic phosphonic acid, and/or a zwitterionic phosphonate. A process for forming a fluid control film is also provided. Further, a process for cleaning a structured surface is provided, including providing a structured surface and a hydrophilic surface treatment covalently bonded to at least a portion of the structured surface, and soiling the structured surface with a material. The process also includes removing the material by at least one of submerging the structured surface in an aqueous fluid, rinsing the structured surface with an aqueous fluid, condensing an aqueous fluid on the structure surface, or wiping the structured surface with a cleaning implement.

13 Claims, 7 Drawing Sheets

(51) Int. Cl.
| | | |
|---|---|---|
| *B32B 7/06* | (2019.01) | |
| *B32B 7/12* | (2006.01) | |
| *B08B 1/00* | (2006.01) | |
| *B08B 3/10* | (2006.01) | |
| *F15D 1/00* | (2006.01) | |
| *B32B 3/30* | (2006.01) | |

(52) U.S. Cl.
CPC .................... *B32B 7/12* (2013.01);
*C08J 5/18* (2013.01); *F15D 1/003* (2013.01);
*F15D 1/0085* (2013.01); *B32B 3/30* (2013.01);
*Y10T 428/2457* (2015.01); *Y10T 428/24579* (2015.01); *Y10T 428/24612* (2015.01)

(58) Field of Classification Search
CPC ... Y10T 428/24612; B08B 1/006; B08B 3/10; F15D 1/003; F15D 1/0085; F25D 21/14
See application file for complete search history.

(56) References Cited

U.S. PATENT DOCUMENTS

| | | | |
|---|---|---|---|
| 4,338,377 | A | 7/1982 | Beck |
| 5,514,120 | A | 5/1996 | Johnston |
| 5,585,186 | A | 12/1996 | Scholz |
| 5,705,583 | A | 1/1998 | Bowers |
| 5,728,446 | A | 3/1998 | Johnston |
| 5,936,703 | A | 8/1999 | Miyazaki |
| 6,040,053 | A | 3/2000 | Scholz |
| 6,225,431 | B1 | 5/2001 | Bowers |
| 6,290,685 | B1 | 9/2001 | Insley |
| 6,372,323 | B1 | 4/2002 | Kobe |
| 6,372,954 | B1 | 4/2002 | Johnston |
| 6,375,871 | B1 | 4/2002 | Bentsen |
| 6,381,846 | B2 | 5/2002 | Insley |
| 6,420,622 | B1 | 7/2002 | Johnston |
| 6,431,695 | B1 | 8/2002 | Johnston |
| 6,514,412 | B1 | 2/2003 | Insley |
| 6,531,206 | B2 | 3/2003 | Johnston |
| 6,746,567 | B2 | 6/2004 | Johnston |
| 6,803,090 | B2 | 10/2004 | Castiglione |
| 6,907,921 | B2 | 6/2005 | Insley |
| 7,223,364 | B1 | 5/2007 | Johnston |
| 7,308,803 | B2 | 12/2007 | Brokaw |
| 7,455,912 | B2 | 11/2008 | Walters |
| 7,909,264 | B2 | 3/2011 | Dunne |
| 2002/0146540 | A1 | 10/2002 | Johnston |
| 2002/0160139 | A1* | 10/2002 | Huang ................... B01J 20/285 428/36.9 |
| 2003/0134515 | A1 | 7/2003 | David |
| 2005/0064275 | A1 | 3/2005 | Mekala |
| 2005/0106360 | A1 | 5/2005 | Johnston |
| 2007/0139451 | A1 | 6/2007 | Somasiri |
| 2009/0242048 | A1 | 10/2009 | Sherman |
| 2012/0273000 | A1 | 11/2012 | Jing |
| 2014/0060583 | A1 | 3/2014 | Riddle |

FOREIGN PATENT DOCUMENTS

| | | |
|---|---|---|
| WO | WO 2009-140482 | 11/2009 |
| WO | WO 2010-114698 | 10/2010 |
| WO | WO 2011-084661 | 7/2011 |
| WO | WO 2011-163175 | 12/2011 |
| WO | WO 2013-066874 | 5/2013 |
| WO | WO 2013-096714 | 6/2013 |
| WO | WO 2013-102099 | 7/2013 |
| WO | WO 2015-143155 | 9/2015 |
| WO | WO 2015-143163 | 9/2015 |
| WO | WO 2015-143262 | 9/2015 |
| WO | WO 2015-164632 | 10/2015 |
| WO | WO 2016-130279 | 8/2016 |

OTHER PUBLICATIONS

Alonso-Amigo, "Polymer Microfabrication for Microarrays, Microreactors and Microfluidics", Journal of Laboratory Automation, 2000, pp. 96-101.
Arkles, "Hydrophobicity, Hydrophilicity and Silane Surface Modification", Gelest Inc., May 24, 2011, 84pgs.
Bragg, "The Form Birefringence of Macromolecules", Acta Crystallographica, 1953, vol. 6, pp. 865-867.
International Search Report for PCT International Application No. PCT/US2015/027025, dated Jul. 27, 2015, 4pgs.

* cited by examiner

US 10,378,813 B2

FLUID CONTROL FILMS WITH HYDROPHILIC SURFACES, METHODS OF MAKING SAME, AND PROCESSES FOR CLEANING STRUCTURED SURFACES

CROSS REFERENCE TO RELATED APPLICATIONS

This application is a national stage filing under 35 U.S.C. 371 of PCT/US2015/027025, filed Apr. 22, 2015, which claims the benefit of U.S. Application No. 61/983,585, filed Apr. 24, 2014 and U.S. Application No. 62/150,498, filed Apr. 21, 2015, the disclosures of which are incorporated by reference in their entirety herein.

TECHNICAL FIELD

This application relates generally to fluid control film layers and methods for cleaning soiled structured surfaces.

BACKGROUND

The collection of liquid within an infrastructure can cause long term problems if it is not dealt with in an appropriate manner. Specifically, water condensation can be very problematic within building infrastructure, causing increased humidity, mold or mildew-related contamination, water damage, safety hazards, and corrosion. The damage caused by water condensation can result in expensive repairs, spoilage of products, and even serious illness due to mold or bacterial infestation.

SUMMARY

Some embodiments discussed herein involve an article that comprises a structure configured to manage liquid. In certain aspects, structured surfaces according to the disclosure exhibit hydrophilic easy clean performance and retain capillary rise with water following heat aging or contamination with oils.

In a first aspect, a fluid control film is provided. The fluid control film includes fluid control channels extending along a channel longitudinal axis. Each of the fluid control channels has a surface and is configured to allow capillary movement of liquid in the channels. The fluid control film further includes a hydrophilic surface treatment covalently bonded to at least a portion of the surface of the fluid control channels. The fluid control film exhibits a capillary rise percent recovery of at least 10%. In many embodiments, the hydrophilic surface treatment includes functional groups selected from a non-zwitterionic sulfonate, a non-zwitterionic carboxylate, a zwitterionic sulfonate, a zwitterionic carboxylate, a zwitterionic phosphate, a zwitterionic phosphonic acid, a zwitterionic phosphonate, or a combination thereof.

In a second aspect, a process for forming a fluid control film is provided. The process includes continuously bringing a flowable material and a molding surface of a molding tool into line contact with each other, forming microchannels within the flowable material, and solidifying the flowable material to form an elongated fluid control film. The fluid control film has a length along a longitudinal axis and a width, in which the length being greater than the width. The microchannels are formed along a channel longitudinal axis. The process further includes covalently bonding a hydrophilic surface treatment to at least a portion of a surface of the microchannels. The hydrophilic surface treatment includes functional groups selected from a non-zwitterionic sulfonate, a non-zwitterionic carboxylate, a zwitterionic sulfonate, a zwitterionic carboxylate, a zwitterionic phosphate, a zwitterionic phosphonic acid, a zwitterionic phosphonate, or a combination thereof In a third aspect, a process for cleaning a structured surface is provided. The process includes providing a structured surface and a hydrophilic surface treatment covalently bonded to at least a portion of the structured surface, and soiling the structured surface with a material. The process further includes removing the material by at least one of submerging the structured surface in an aqueous fluid, rinsing the structured surface with an aqueous fluid, condensing an aqueous fluid on the structure surface, or wiping the structured surface with a cleaning implement. At least 50% of a 2-dimensional projected area of the structured surface is free of the material. The hydrophilic surface treatment typically includes functional groups selected from a non-zwitterionic sulfonate, a non-zwitterionic carboxylate, a zwitterionic sulfonate, a zwitterionic carboxylate, a zwitterionic phosphate, a zwitterionic phosphonic acid, a zwitterionic phosphonate, or a combination thereof.

The above summary is not intended to describe each disclosed embodiment or every implementation of the present disclosure. The figures and the detailed description below more particularly exemplify illustrative embodiments.

BRIEF DESCRIPTION OF THE DRAWINGS

FIG. 3b is a schematic sectional view as taken along line 3b-3b in FIG. 3a.

Figure 1A:
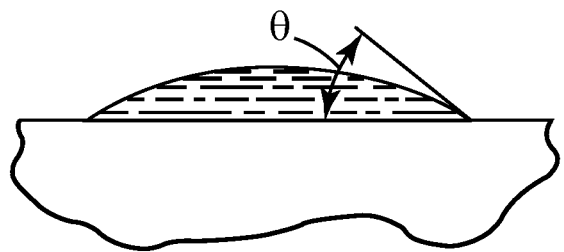
FIGS. 1a and 1b are schematic diagrams used to illustrate interaction of a fluid on a surface.

The figures are not necessarily to scale. Like numbers used in the figures refer to like components. However, it will be understood that the use of a number to refer to a component in a given figure is not intended to limit the component in another figure labeled with the same number. While the above-identified drawings set forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

Various exemplary embodiments of the disclosure will now be described, with particular reference to the Examples and the Figures. Exemplary embodiments of the disclosure may take on various modifications and alterations without departing from the spirit and scope of the disclosure. Accordingly, it is to be understood that the embodiments of the disclosure are not to be limited to the following described exemplary embodiments, but is to be controlled by the limitations set forth in the claims and any equivalents thereof.

As used throughout this specification and the appended embodiments, the recitation of numerical ranges by endpoints includes all numbers subsumed within that range (e.g. 1 to 5 includes 1, 1.5, 2, 2.75, 3, 3.8, 4, and 5).

Unless otherwise indicated throughout this specification and the appended embodiments, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

For the following Glossary of defined terms, these definitions shall be applied for the entire application, including the claims:

Glossary

The terms "a", "an", and "the" are used interchangeably with "at least one" to mean one or more of the elements being described.

The term "and/or" means either or both. For example "A and/or B" means only A, only B, or both A and B.

The terms "suitable" and "preferably" refer to embodiments of the disclosure that may afford certain benefits under certain circumstances. Other embodiments may also be suitable; however, under the same or other circumstances. Furthermore, the recitation of one or more suitable embodiments does not imply that other embodiments are not useful, and is not intended to exclude other embodiments from the scope of the disclosure.

The term "comprises" and variations thereof (e.g., "includes") do not have a limiting meaning where these terms appear in the description and claims. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The term "organic group" means a hydrocarbon group (with optional elements other than carbon and hydrogen, such as oxygen, nitrogen, sulfur, and silicon) that is classified as an aliphatic group, cyclic group, or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkylene group" is a divalent alkyl group. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "cyclic group" means a closed ring hydrocarbon group that is classified as an alicyclic group, aromatic group, or heterocyclic group. The term "alicyclic group" means a cyclic hydrocarbon group having properties resembling those of aliphatic groups. The term "aromatic group" or "aryl group" means a mono- or polynuclear aromatic hydrocarbon group. The term "heterocyclic group" means a closed ring hydrocarbon in which one or more of the atoms in the ring is an element other than carbon (e.g., nitrogen, oxygen, sulfur, etc.). A group that may be the same or different is referred to as being "independently" something.

When a group is present more than once in a formula described herein, each group is "independently" selected, whether specifically stated or not. For example, when more than one Y group is present in a formula, each Y group is independently selected. Furthermore, subgroups contained within these groups are also independently selected. For example, when each Y group contains an R, then each R is also independently selected.

Substitution is anticipated on the organic groups of the complexes of the present disclosure. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like.

The term "primary particle size" refers to the average size of unagglomerated single particles of silica.

The term "hydrophilic" is used to refer to a surface that is wet by aqueous solutions, and does not express whether or not the layer absorbs aqueous solutions. Surfaces on which drops of water or aqueous solutions exhibit an advancing water contact angle of less than 45° are referred to as "hydrophilic" per ASTM D7334-08. Hydrophobic substrates have a water contact angle of 90° or greater.

Water condensation can be problematic in the operation of manufacturing and processing plants. In particular, managing condensation can be difficult in situations that require regular cleaning, for example, high pressure cleaning and sanitizing with hot water and/or liquid cleaning solutions. Persistent condensation can cause structural damage due to water damage and/or corrosion, can cause environmental damage due to mold and mildew, and provides a breeding ground for bacteria. Mold, mildew and bacterial infestation can lead to serious illness.

Embodiments discussed herein involve fluid transport surfaces (e.g., fluid control films and other structured surfaces) that enable rapid evaporation of condensation. Fluid transport features containing hydrophilic microreplicated capillary structures allow the spreading of liquid droplets or condensation over a larger area. The increase in surface to volume of liquid ratio increases the evaporation rate and promotes more rapid drying.

Hydrophilicity and water transport properties of structured surfaces coated with traditional hydrophilic materials tend to decrease (or be completely lost) when the surface is contaminated, such as by inorganic or organic oil species. Water that contacts these oil-contaminated structured surfaces does not spread via capillary action and oily contaminants are not removed from the film surface upon, for example, submersion in water. Structured surfaces functionalized with the hydrophilic easy clean functional groups described herein, in contrast, retain substantial hydrophilicity even after their surfaces are completely covered with contaminants such as oil. For instance, contacting water can wick and spread in capillary channels of fluid control films, and oily contaminants are removed by actions such as submerging the contaminated sample in water, hence structured surfaces according to certain embodiments of the present disclosure are reusable following contamination and cleaning. However, not all hydrophilic functional groups provide an easy clean capability to a structured surface.

Additionally, certain functionalized structured surfaces retain at least some of their hydrophilicity following heat aging, whereas the same surfaces having a plasma-deposited diamond-like glass (DLG) coating without hydrophilic functionalization do not wick water to a significant extent following heat aging. This maintenance of hydrophilicity and water capillarity following oil contamination and/or heat aging is advantageous in achieving a successful condensation management program due to potentially improving both the shelf life and performance lifetime of the product.

A way to quantify an easy clean performance of a fluid control film is by comparing the capillary rise of water of a fluid control film that has not been contaminated to the capillary rise of the same fluid control film following contamination and subsequent cleaning by rinsing with water. Capillary rise is measured by measuring the vertical height that water is transported on a fluid control film in two minutes. In this test, the fluid control film is placed in a volume of water oriented perpendicular to the surface of the water, with one edge (having channel openings) submerged below the water. Each measurement of the vertical height of the transported water (above the submerged edge) is repeated three times and averaged. Capillary rise is measured before and after a surface is contaminated with silicone oil. Prior to taking the "after contamination" capillary height measurements, the fluid control film is rinsed with deionized water for 30 seconds at a flow rate of 600 mL/minute per ten square inches (64.5 square centimeters) of film, and allowed to dry overnight at 20 degrees Celsius (68 degrees Fahrenheit). Percent recovery can be calculated, which is the percentage of capillary rise retained after contamination versus the capillary rise before contamination. A capillary rise percent recovery of hydrophilic surface treated fluid control films of the present disclosure is at least 10%, or at least 15%, or at least 20%, or at least 25%, or at least 30%, or at least 35%, or at least 40%, or at least 45%, or at least 50%, or at least 55%, or at least 60%, or at least 65%.

Fluid transport surfaces as described herein can be particularly effective when used on largely horizontal structures that may accumulate liquids, for example ceilings or the underside of overhead pipes. The accumulation of liquid in these areas may be a result of natural condensation or from liquids being dispersed on the surface, for example for cleaning purposes. On largely horizontal surfaces, condensate droplets tend to persist for prolonged periods of time unless additional condensation mitigation efforts are made, such as mopping the ceiling and overhead pipes.

Fluid transport surfaces discussed below are configured to wick the hanging droplets into hydrophilic microreplicated channels and to disperse the liquid by capillary action across the fluid transport surface, thus significantly increasing the surface to volume ratio of the liquid and promoting evaporation. Fluid transport features on a horizontally oriented structure having a convex outer surface, such as a pipe, provide a capillary wicking direction that has component orthogonal to the direction of the gravitational force. In some embodiments, the fluid transport features may direct the condensate fluid to designated locations. These locations may be chosen based on drainage points or designated drip points. The designated drip points may direct the condensate fluid away from underlying sensitive equipment such as food processing lines. Generally, the susceptibility of a solid surface to be wet out by a fluid is characterized by the contact angle that the fluid makes with the solid surface after being deposited on the horizontally disposed surface and allowed to stabilize thereon. It is sometimes referred to as the "static equilibrium contact angle," sometimes referred to merely as "contact angle." In general, hydrophilic materials form a contact angle with water that is less than 45 degrees.

Figure 1B:
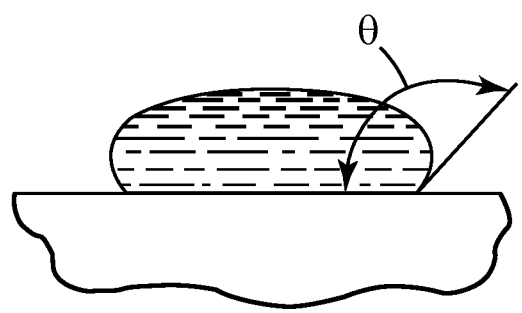

As shown in FIGS. 1a and 1b, the contact angle Theta (θ) is the angle between a line tangent to the surface of a bead of fluid on a surface at its point of contact to the surface and the plane of the surface. A bead of fluid whose tangent was perpendicular to the plane of the surface would have a contact angle of 90 degrees. Typically, if the contact angle is 45 degrees or less, as shown in FIG. 1a, the solid surface is considered to be wet by the fluid. Surfaces on which drops of water or aqueous solutions exhibit a contact angle of less than 45 degrees are commonly referred to as "hydrophilic". As used herein, "hydrophilic" is used only to refer to the surface characteristics of a material, i.e., that it is wet by aqueous solutions, and does not express whether or not the material absorbs aqueous solutions. Accordingly, a material may be referred to as hydrophilic whether or not a sheet of the material is impermeable or permeable to aqueous solutions. Thus, hydrophilic films used in the present application may be formed from films prepared from resin materials that are inherently hydrophilic, such as for example, poly(vinyl alcohol). Fluids which yield a contact angle of near zero on a surface are considered to completely wet out the surface. Polyolefins, however, are typically inherently hydrophobic, and the contact angle of a polyolefin film, such as polyethylene or polypropylene, with water is typically greater than 90 degrees, such as shown in FIG. 1b.

In a first aspect, a fluid control film is provided. The fluid control film includes fluid control channels extending along a channel longitudinal axis. Each of the fluid control channels has a surface and is configured to allow capillary movement of liquid in the channels. The fluid control film further includes a hydrophilic surface treatment covalently bonded to at least a portion of the surface of the fluid control channels. The fluid control film exhibits a capillary rise percent recovery of at least 10%. Typically, the hydrophilic surface treatment includes functional groups selected from a non-zwitterionic sulfonate, a non-zwitterionic carboxylate, a zwitterionic sulfonate, a zwitterionic carboxylate, a zwitterionic phosphate, a zwitterionic phosphonic acid, a zwitterionic phosphonate, or a combination thereof.

In a second aspect, a process for forming a fluid control film is provided. The process includes continuously bringing a flowable material and a molding surface of a molding tool into line contact with each other, forming microchannels within the flowable material, and solidifying the flowable material to form an elongated fluid control film. The fluid control film has a length along a longitudinal axis and a width, in which the length being greater than the width. The microchannels are formed along a channel longitudinal axis. The process further includes covalently bonding a hydrophilic surface treatment to at least a portion of a surface of the microchannels. The hydrophilic surface treatment includes functional groups selected from a non-zwitterionic sulfonate, a non-zwitterionic carboxylate, a zwitterionic sulfonate, a zwitterionic carboxylate, a zwitterionic phosphate, a zwitterionic phosphonic acid, a zwitterionic phosphonate, or a combination thereof.

The below disclosure relates to both the first aspect and the second aspect.

The fluid control films according to the present disclosure comprise a microstructured surface. Fluid control films may have a variety of topographies. Exemplary fluid control films are comprised of a plurality of channels with V-shaped or rectangular cross-sections, and combinations of these, as well as structures that have channels, secondary channels, i.e., channels within channels. Additionally, the topography may include microstructured posts and protrusions.

The channels on the microstructured surface have channel ends. In certain embodiments, the fluid control film may include a removing means. The removing means generally withdraws fluid from the channels adjacent one of the channel ends. In another embodiment, the removing means withdraws the fluid from the channels adjacent both channel ends. The removing means may include an absorbent material disposed in communication with the channels. In one embodiment, the removing means includes a fluid drip collector.

Generally, the channels in the microstructure are defined by generally parallel ridges including a first set of ridges having a first height and a second set of ridges having a second, taller height. An upper portion of each ridge of the second set of ridges may have a lower melting temperature than a lower portion thereof. The channels have a pattern geometry selected from the group consisting of linear, curvilinear, radial, parallel, nonparallel, random, or intersecting.

Figure 2A:
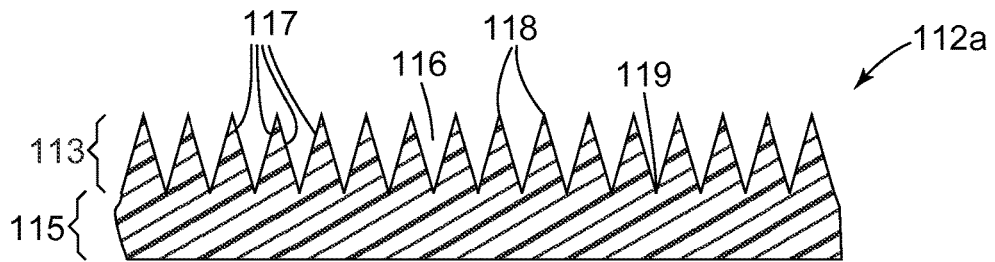
FIGS. 2a, 2b, and 2d through 2j are cross-sectional cutaway views of exemplary embodiments of fluid control films.

As shown in FIG. 2a, a fluid control film layer 112a has a first major surface 113 and second major surface 115 wherein the first major surface 113 includes a plurality of microstructured channels 116. The channels 116 are defined within the structured surface 113 in accordance with the illustrated embodiment by a series of v-shaped sidewalls 117 and peaks 118. In some cases, the sidewalls 117 and peaks 118 may extend entirely from one edge of the layer 112a to another without alteration—although, in some applications, it may be desirable to shorten the sidewalls 117 and thus extend the peaks 118 only along a portion of the structured surface 113. That is, channels 116 that are defined between peaks 118 may extend entirely from one edge to another edge of the layer 112a, or such channels 116 may only be defined to extend over a portion of the layer 112a. Channels that extend only over a portion may begin at an edge of the layer 112a, or they may begin and end intermediately within the structured surface 113 of the layer 112a. The channels are defined in a predetermined, preferably ordered arrangement over a continuous surface of polymeric material.

Figure 2B:
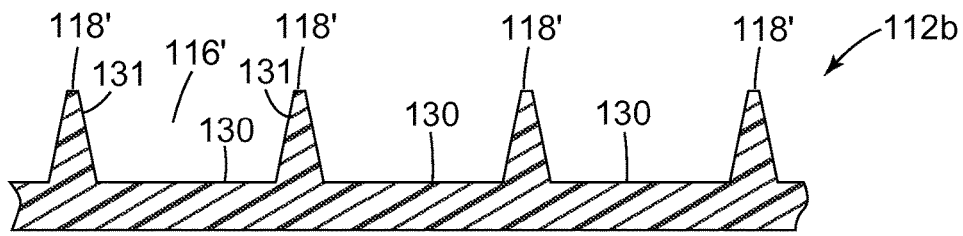

As shown in FIG. 2b, another embodiment of a fluid control film layer 112b is shown including channels 116' that have a wider flat valley between slightly flattened peaks 118'. In this embodiment, bottom surfaces 130 extend between channel sidewalls 131, whereas in the FIG. 2a embodiment, sidewalls 117 connect together to form lines 119.

Figure 2C:
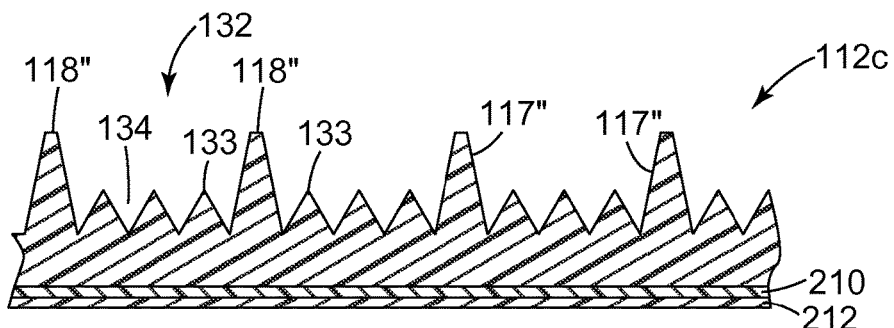
FIG. 2c is a cross-sectional cutaway view of an exemplary embodiment of a fluid control film further having an adhesive layer and a release layer.

FIG. 2c illustrates another embodiment of a fluid control film layer 112c configured with wide channels 132 defined between peaks 118". However, instead of providing a flat surface between channel sidewalls 117", a plurality of smaller peaks 133 are located between the sidewalls 117" of the peaks 118". These smaller peaks 133 thus define secondary channels 134 therebetween. Peaks 133 may or may not rise to the same level as peaks 118", and as illustrated create a first wide channel 132 including smaller channels 134 distributed therein. The peaks 118" and 133 need not be evenly distributed with respect to themselves or each other. The fluid control film layer 112c shown in FIG. 2c further includes an optional adhesive layer 210 and an optional release layer 212 disposed on the surface of the adhesive layer 210 opposite the fluid control film layer 112c. The release layer 212 may be included to protect the adhesive layer 210 prior to the application of the adhesive layer 210 to an external surface. Conventional release layers often include silicone, which can contaminate fluid control film layer surfaces. Hence, the easy clean functionality of fluid control films according to embodiments of the disclosure assists in minimizing the effect of any silicone contamination from the optional release layer.

FIGS. 2e through 2j illustrate various alternative embodiments of fluid control films. Although FIGS. 2a through 2j illustrate elongated, linearly-configured channels, the channels may be provided in other configurations. For example, the channels could have varying cross-sectional widths along the channel length; that is, the channels could diverge and/or converge along the length of the channel. The channel sidewalls could also be contoured rather than being straight in the direction of extension of the channel, or in the channel height. Generally, any channel configuration that can provide at least multiple discrete channel portions that extend from a first point to a second point within the fluid transport device are contemplated. The channels may be configured to remain discrete along their whole length if desired. In most embodiments of fluid control films according to the present disclosure, the channels are configured to provide a capillary force on a liquid in the channels that is greater than a gravitational force on the liquid.

Figure 2D:
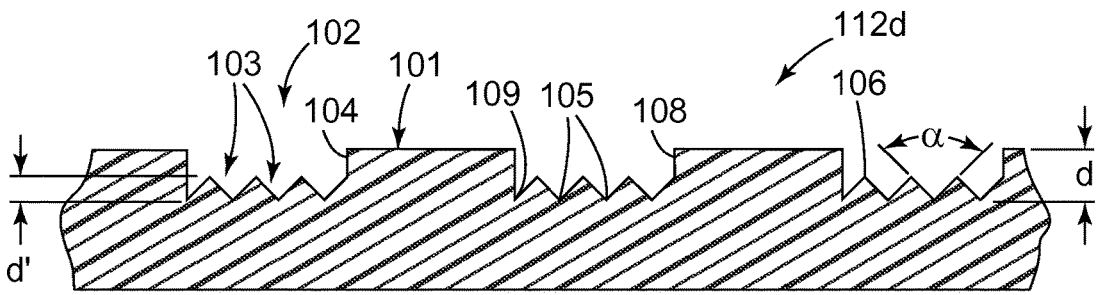
Figure 2E:
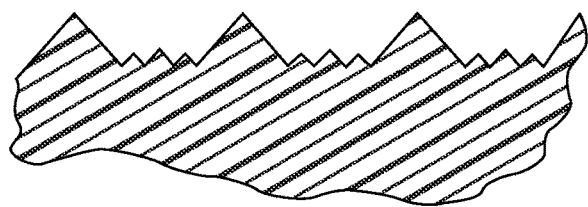
Figure 2F:
Figure 2G:
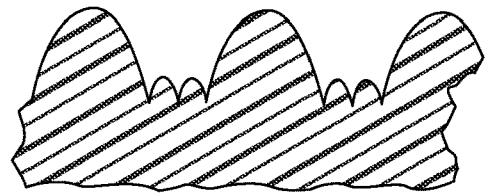
Figure 2H:
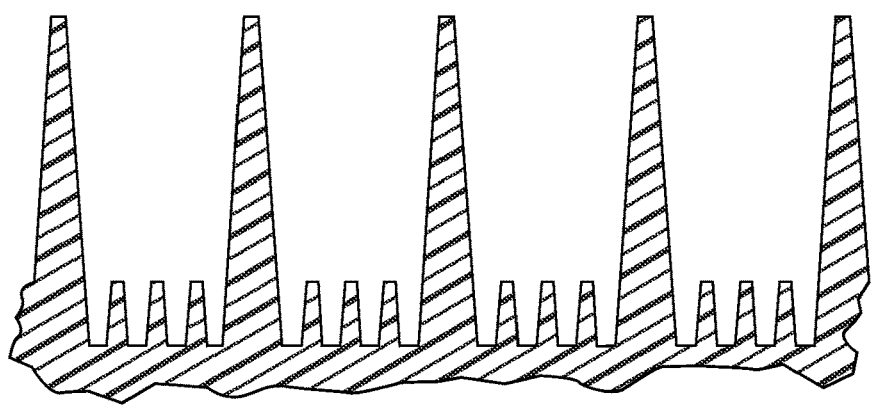

With reference to FIG. 2d, an exemplary embodiment of a fluid control film layer 112d includes a channel geometry having a plurality of rectilinear primary channels 102 formed between flat lands 101. The primary channel 102 has included secondary channels 103 formed by a multitude of notches 105. The notches 105 (or secondary channels 103, where the channels are V-shaped and have substantially straight sidewalls) have an included angle, Alpha (α), from about 10 degrees to about 120 degrees, preferably from about 10 degrees to about 100 degrees, and most preferably from about 20 degrees to about 95 degrees. The notch included angle is generally the secant angle taken from the notch to a point 2 to 1000 micrometers from the notch on the sidewalls forming the notch, preferably the included angle is the secant angle taken at a point halfway up the secondary channel sidewalls.

The primary channel included angle is not critical except in that it should not be so wide that the primary channel is ineffective in channeling liquid. Generally, the primary channel maximum width is less than 3000 micrometers and preferably less than 1500 micrometers. The included angle of a V-channel shaped primary channel will generally be from about 10 degrees to 120 degrees, preferably 30 to 90 degrees. If the included angle of the primary channel is too narrow, the primary channel may not have sufficient width at its base so that it is capable of accommodating an adequate number of secondary channels. Generally, it is preferred that the included angle of the primary channel be greater than the included angle of the secondary channels so as to accommodate two or more secondary channels at the base of the primary channel. Generally, the secondary channels have an included angle at least 20 percent smaller than the included angle of the primary channel (for V-shaped primary channels).

Figure 2I:
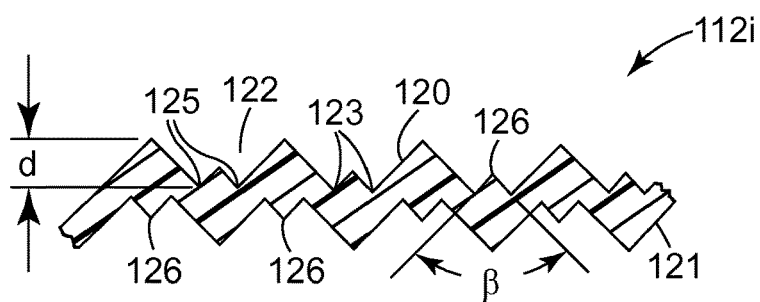

With reference to FIGS. 2d and 2i, the depth, d, of the primary channels 102, 122, which is the height of the peaks or tops above the lowermost channel notch, is preferably substantially uniform. Depth, d, is suitably from about 5 to about 3000 micrometers, typically from about 50 to about 3000 micrometers, preferably from about 75 to about 1500 micrometers, and most preferably is from about 100 to about 1000 micrometers. It will be understood that in some embodiments, films with channels 102, 122 having depths, d, larger than the indicated ranges may be used. If the channels 102, 122 are unduly deep, the overall thickness of the fluid control film will be unnecessarily high and the film may tend to be stiffer than is desired. In certain embodiments of fluid control films according to the present disclosure, the channels comprise a depth of less than 500 micrometers, or less than 400 micrometers, or less than 300 micrometers. Such maximum depths can be relevant when the fluid control film is used in a configuration (e.g., affixed to a lower surface of an article) in which gravity can act against a fluid drop in the channel. In most embodiments, the channels are configured to provide a capillary force on a liquid in the channels that is greater than a gravitational force on the liquid.

Figure 2J:
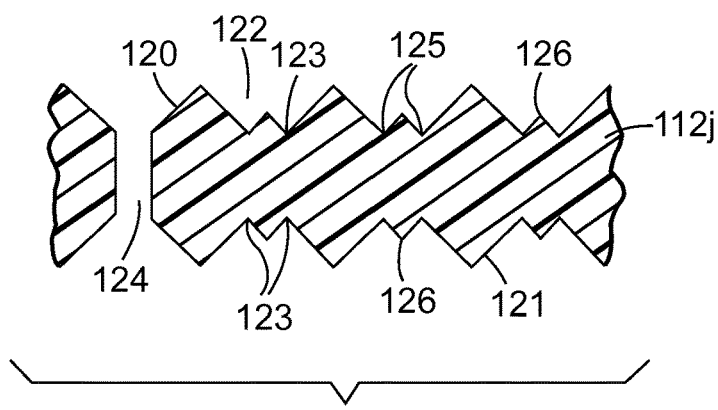

FIGS. 2i and 2j illustrate fluid control films 112i and 112j having primary channels on both major surfaces 120 and 121. As shown in FIG. 2i, the primary channels 122 may be laterally offset from one surface 120 to the other surface 121, or may be aligned directly opposite each other as shown in FIG. 2j. A fluid control film 112i with offset channels as shown in FIG. 2i provides a maximum amount of surface area for fluid transport while at the same time using a minimum amount of material. In addition, a fluid control film 112i with offset channels can be made so as to feel softer, due to the reduced thickness and stiffness of the sheet, than a fluid control film 112j with aligned channels as shown in FIG. 2j. Referring to FIG. 2j, fluid control films 112j usable with the present disclosure may have one or more holes or apertures 124 therein, which enable a portion of the liquid in contact with the first surface 120 of the fluid control film 112j to be transported to the second surface 121 of the film to improve liquid control and increase versatility in liquid flow. The apertures 124 need not be aligned with a notch of a channel, but may be positioned wherever is necessary or convenient. In addition, the apertures 124 may vary in width from aperture to aperture, and may vary in width relative to the channels. The surfaces of the fluid control film within the apertures 124 are preferably designed to encourage fluid flow through the aperture 124.

As representatively illustrated in FIGS. 2d and 2i, in each primary channel 102, 122 are at least two secondary channels 103, 123 and at least two notches 105, 125, the notch 105, 125 or notches of each secondary channel 103, 123 is separated by a secondary peak 106, 126. Generally, each secondary channel 103, 123 will generally have only one notch 105, 125, but a secondary channel 103, 123 will have two notches 105, 125 if the secondary channel 103, 123 is rectangular. The secondary peak 106, 126 for V-channel shaped secondary channels 103, 123 is generally characterized by an included angle Beta (β) which is generally equal to $(\alpha^1+\alpha^2)/2$ where $\alpha^1$ and $\alpha^2$ are the included angles of the two adjacent V-channel shaped secondary channels 103, 123, assuming that the two sidewalls forming each secondary channel are symmetrical and not curved. Generally, the angle β would be from about 10 degrees to about 120 degrees, preferably from about 10 degrees to about 90 degrees, and most preferably from about 20 degrees to about 60 degrees. The secondary peak could also be flat (in which case the included angle would theoretically be 0 degrees) or even curved, e.g., convex or concave, with no distinct top or included angle. Preferably, there are at least three secondary channels 103, 123 and/or at least three notches for each primary channel 102, 122, including any notches 108 or 109 associated with the end channels as shown in FIG. 2d.

The depth, d', of one of the secondary channels 103, 123, which is the height of the top of the secondary peaks 106 over the notches 105 as shown in FIG. 2d, is uniform over the length of the fluid control films and is typically at least 5 micrometers. The depth, d', of the secondary channels 103, 123 is generally 0.5 to 80 percent of the depth of the primary channels, preferably 5 to 50 percent. The spacing of the notches 105, 125 on either side of a peak 106, 126 is also preferably uniform over the length of the fluid control film 112i, 112j. Preferably the primary and/or secondary channel depth and width varies by less than 20 percent, preferably less than 10 percent for each channel over a given length of the fluid control film. Variation in the secondary channel depth and shape above this range has a substantial adverse impact on the rate and uniformity of liquid transport along the fluid control film. Generally the primary and secondary channels are continuous and undisturbed.

Figure 2K:
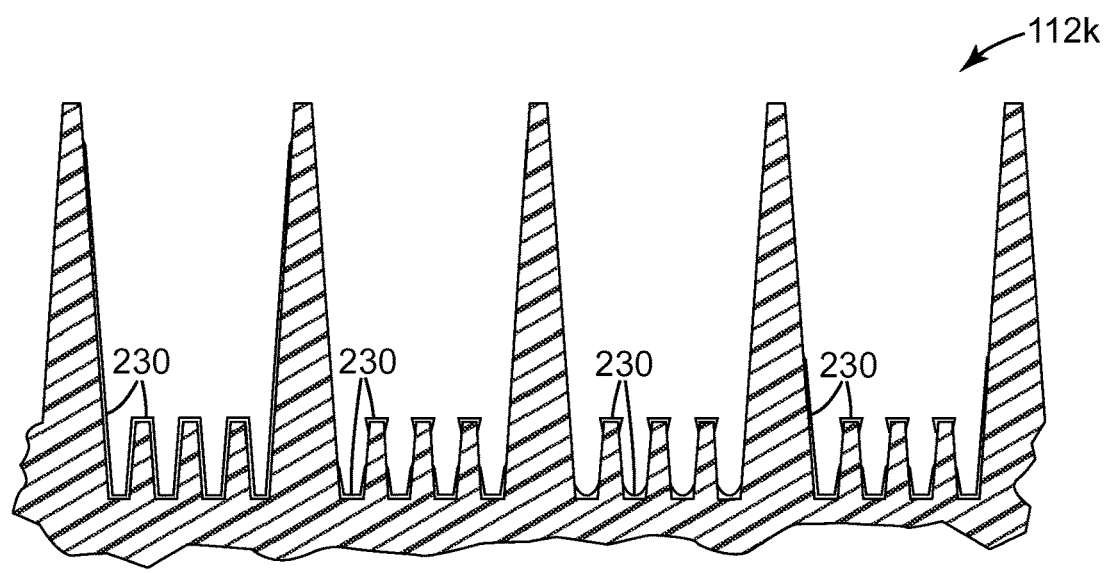
FIG. 2k is a cross-sectional cutaway view of an exemplary embodiment of a fluid control film further having a siliceous primer disposed thereon.

In certain embodiments, a siliceous primer is provided on a fluid control film. For example, FIG. 2k is illustrative of a fluid control film 112k having a siliceous primer 230 disposed on at least a portion of a surface of the fluid control film. Depending on how the siliceous primer 230 is deposited on the fluid control film 112k (e.g., solution coating, plasma deposition, etc.), the primer can be disposed on some or all of the surfaces of the channels of the fluid control film. FIG. 2k shows variations in the coverage of the channel surfaces by the siliceous primer 230.

Figure 3A:
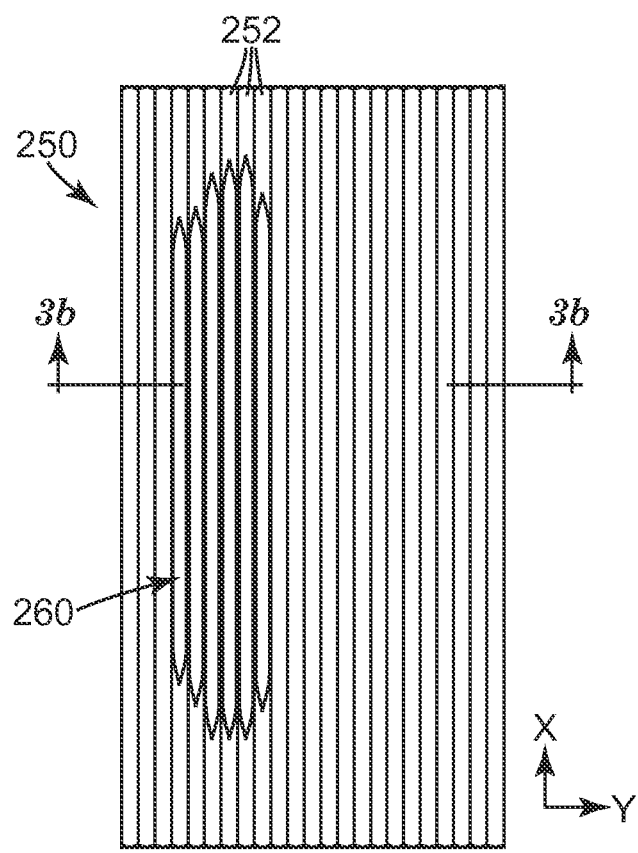
FIG. 3a is a schematic illustration of a channeled microstructured surface of the present disclosure with a quantity of fluid thereon.
Figure 3B:
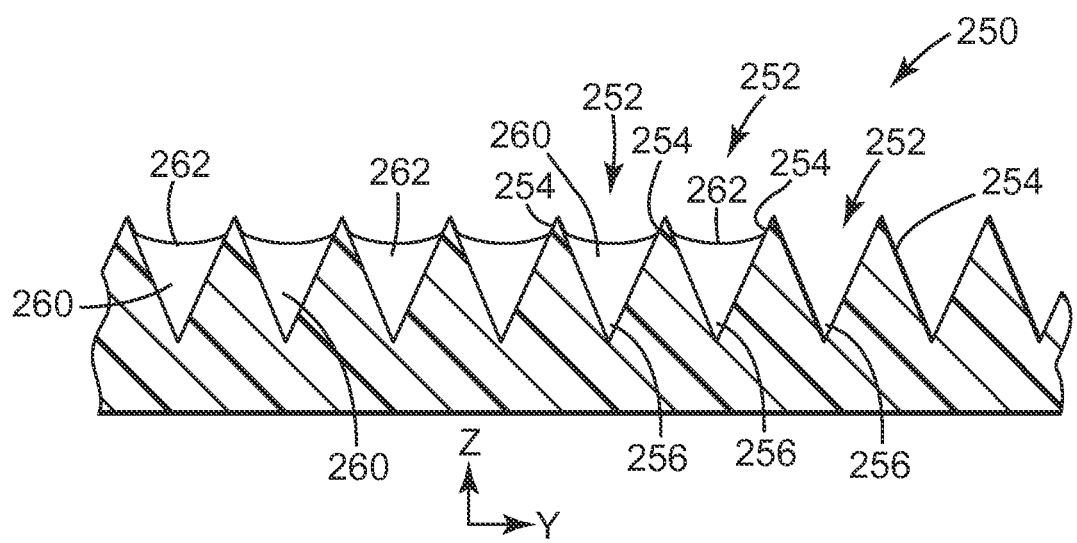

FIGS. 3a and 3b are illustrative of fluid flow effects across the face of a structured surface having a plurality of parallel channels, and specifically, of the increase in exposed fluid surface area achieved when a fluid is disposed on the structured surface. A structured surface 250 having a plurality of channels 252 defined thereon has a fluid introduced thereon. In this exemplary illustration, the structured surface has a topography similar to FIG. 2a, with alternating peaks 254 and valleys 256. A fluid 260 is introduced onto the structured surface 250. The channels 252 are formed to spontaneously wick the fluid along each channel, which receives fluid therein to increase the spatial distribution of the fluid in the x-direction. As the fluid 260 fills each channel 252, its spatial distribution is also increased in the y-direction between the ridges of each channel 252, and the meniscus height of the fluid 260 varies in the z-direction within each channel 252, as seen in FIG. 3b. Adjacent each ridge, the fluid's exposed surface 262 is higher. These effects in three dimensions serve to increase the exposed evaporatively active surface area of the fluid 260, which, in turn, has the effect of enhancing the evaporation rate of the fluid 260 from the structured surface 250.

Figure 3C:
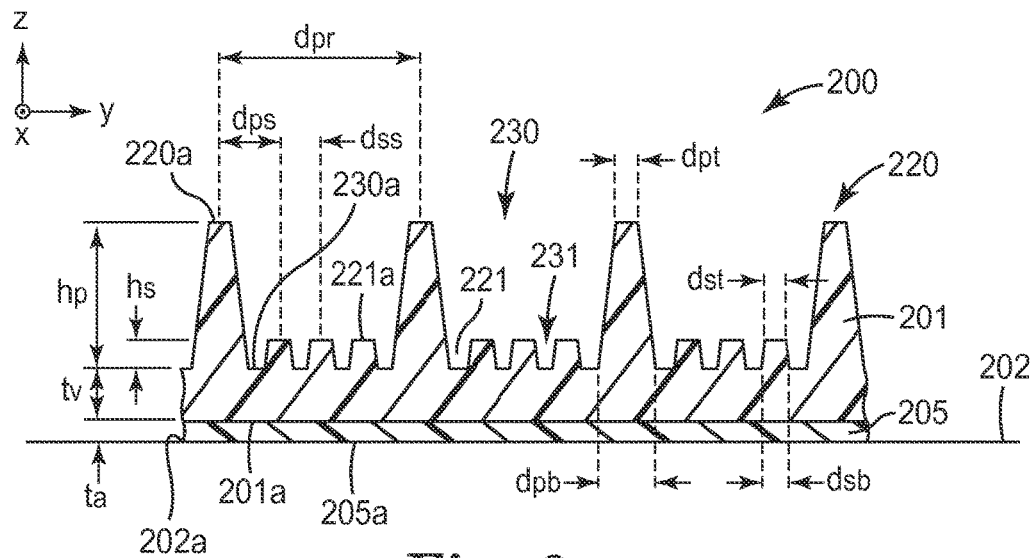
FIG. 3c illustrates a cross section of a fluid control film layer with primary and secondary channels according to an exemplary embodiment.

FIG. 3c is a cross section of a fluid control film 200 according to an exemplary embodiment. The fluid control film 200 comprises a fluid control film layer 201 having primary and secondary channels 230, 231 defined by primary and secondary ridges 220, 221, wherein the channels 230, 231 and ridges 220, 221 run along a channel axis that makes an angle, θ, with respect to the longitudinal axis of the fluid control film layer 201, e.g., the x-axis as previously discussed in connection with FIG. 2a. Each primary channel 230 is defined by a set of primary ridges 220 (first and second) on either side of the primary channel 230. The primary ridges 220 have a height $h_p$ that is measured from the bottom surface 230a of the channel 230 to the top surface 220a of the ridges 220. In some embodiments, microstructures are disposed within the primary channels 230. In some embodiments, the microstructures comprise secondary channels 231 disposed between the first and secondary primary ridges 220 of the primary channels 230.

Each of the secondary channels 231 is associated with at least one secondary ridge 221. The secondary channels 231 may be located between a set of secondary ridges 221 or between a secondary ridge 221 and a primary ridge 220.

The center-to-center distance between the primary ridges, $d_{pr}$, may be in a range of about 25 micrometers to about 3000 micrometers; the center-to-center distance between a primary ridge and the closest secondary ridge, $d_{ps}$, may be in a range of about 5 micrometers to about 350 micrometers; the center-to-center distance between two secondary ridges, $d_{ss}$, may be in a range of about 5 micrometers to about 350 micrometers. In some cases, the primary and/or secondary ridges may taper with distance from the base. The distance between external surfaces of a primary ridge at the base, $d_{pb}$, may be in a range of about 15 micrometers to about 250 micrometers and may taper to a smaller distance of $d_{pt}$ in a range of about 1 micrometers to about 25 micrometers. The distance between external surfaces of a secondary ridge at the base, $d_{sb}$, may be in a range of about 15 micrometers to about 250 micrometers and may taper to a smaller distance of $d_{st}$ in a range of about 1 micrometers to about 25 micrometers. In one example, $d_{pp}$=0.00898 inches (228 micrometers), $d_{ps}$=0.00264 inches (67 micrometers), $d_{ss}$=0.00185 inches (47 micrometers), $d_{pb}$=0.00251 inches (64 micrometers), $d_{pt}$=0.00100 inches (25 micrometers), $d_{sb}$=0.00131 inches (33 micrometers), $d_{st}$=0.00100 inches (25 micrometers), $h_p$=0.00784 inches (199 micrometers), and $h_s$=0.00160 inches (41 micrometers).

The secondary ridges have height $h_s$ that is measured from the bottom surface 230a of the channel 230 to the top surface 221a of the secondary ridges 221. The height $h_p$ of the primary ridges 220 is often greater than the height $h_s$ of the secondary ridges 221. In some embodiments the height of the primary ridges is between about 25 micrometers to about 3000 micrometers and the height of the secondary ridges is between about 5 micrometers to about 350 micrometers. In some embodiments, a ratio of the secondary ridge 221 height $h_s$ to the primary ridge 220 height $h_p$ is about 1:5. The primary ridges 220 can be designed to provide durability to the fluid control film layer 200 as well as protection to the secondary channels 231, secondary ridges and/or or other microstructures disposed between the primary ridges 220.

The fluid control film 200 optionally has an adhesive layer 205 disposed on the bottom surface 201a of the fluid control film layer 201. The adhesive layer 205 may allow the fluid control film layer 200 to be attached to some external surface 202 to help manage liquid dispersion across the external surface. The combination of an adhesive layer 205 and the fluid control film layer 201 forms a fluid control tape. The adhesive layer 205 may be continuous or discontinuous.

The fluid control film layer 201 is configured to disperse fluid across the surface of the fluid control film layer 201 to facilitate evaporation of the fluid. In some embodiments, the adhesive layer 205 may be or comprise a hydrophobic material that repels liquid at the interface 202a between the adhesive layer 205 and the external surface 202, reducing the collection of liquid at the interface 202a.

The adhesive layer 205 has a thickness $t_a$ and the fluid control film layer 201 has a thickness $t_v$ from the bottom surface 230a of the channels 230, 231 to the bottom surface 201a of the fluid control film layer 201. In some embodiments, the total thickness between the bottom surface 230a of the channels 230, 231 and the bottom surface 205a of the adhesive layer 205, $t_v+t_a$ can be less than about 300 micrometers, e.g., about 225 micrometers. This total thickness $t_v+t_a$ may be selected to be small enough to allow liquid to be efficiently wicked from the external surface 202 through the channel openings at the edges of the fluid control film layer 201 and into the channels 230, 231.

Figure 4A:
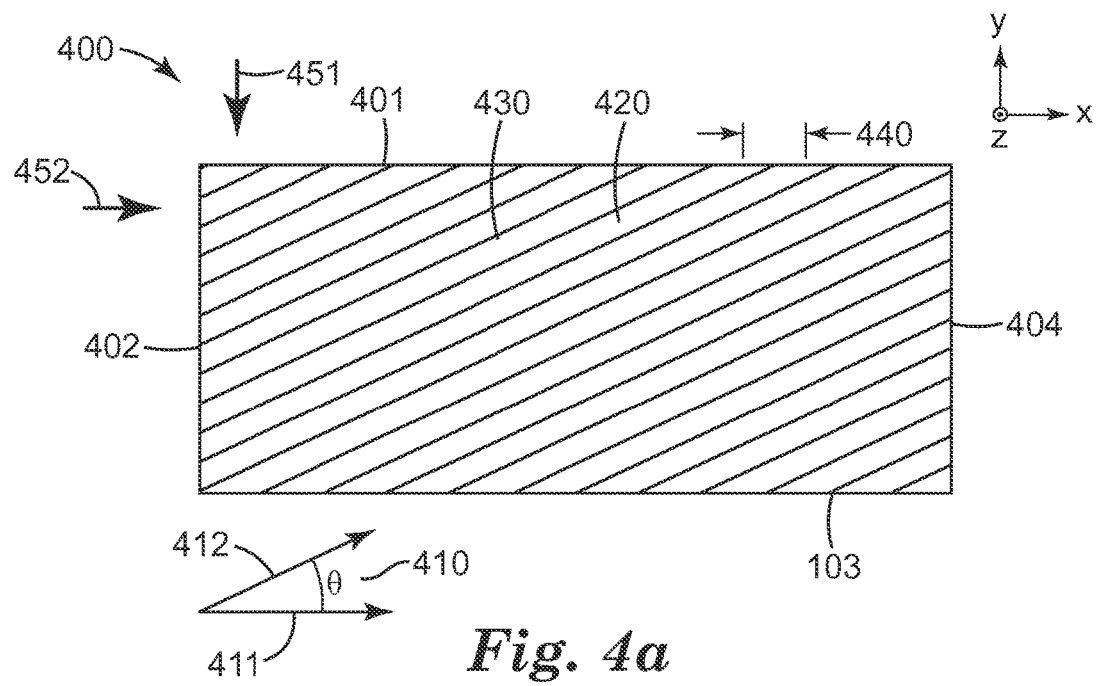
FIG. 4a illustrates a fluid control film layer with angled channels according to an exemplary embodiment.

FIG. 4a illustrates an elongated fluid control film layer with flow channels (microchannels) that are disposed at an angle, θ, with respect to a longitudinal axis of the fluid control film layer, the x-axis in FIG. 4a. Fluid control film layer 400 includes an array of channels 430 that extend across the fluid control film layer 400 along a channel longitudinal axis 412. Ridges 420 rise above the surface of the fluid control film layer 400 along the z axis to form the channels 430, with each channel 430 having a ridge 420 on either side running along the channel longitudinal axis 412. In some embodiments, each set of adjacent ridges 420 are equally spaced apart. In other embodiments, the spacing of the adjacent ridges 420 may be at least two different distances apart. A longitudinal axis 411 of the fluid control film layer 400 intersects with the channel longitudinal axis 412 to make a channel angle 410. The angle 410 may be between 0 and 90 degrees. In some embodiments, the channel angle 410 is less than about 45 degrees. In some embodiments, the channel angle 410 is between about 5 degrees and about 30 degrees, or about 5 degrees to about 20 degrees or about 10 degrees to about 15 degrees. In some embodiments, the channel angle 110 is about 20 degrees.

The channels 430 are configured to provide capillary movement of fluid in the channels 430 and across the fluid control film layer 400. The capillary action wicks the fluid to disperse it across the fluid control film layer 400 so as to increase the surface to volume ratio of the fluid and enable more rapid evaporation. The dimensions of the channel openings 440 can be configured to wick fluid that collects at an edge 401, 402, 403, 404 of the fluid control film layer 400 into the channels 430 by capillary action. The channel cross section 430, channel surface energy, and fluid surface tension determines the capillary force. The land thickness $t_v$ provides a ledge that can impede liquid acquisition. Preferably the land thickness is kept to a minimum to encourage rapid liquid acquisition. Small channel angles 410 provide larger openings 440 at the top and bottom edges 401, 403 which run along the longitudinal axis of the fluid control film layer 400 as shown in FIG. 4a. Larger openings 440 of the channels 430 results in fewer openings 440 per unit of length along the top and bottom edges 401, 403 of the fluid control film layer 400.

Each channel 430 in the fluid control film layer 400 has a first opening at a first edge of the fluid control film layer 400 and a second opening at a second edge of the fluid control film layer 400. For example, the first opening may be located on a first edge 401 and the second opening may be located on a second edge 402 that is adjacent and intersects the first edge 401. In this example, the first and second opening may be the same size or different sizes depending on the channel angle 410. Fluid can enter the fluid control film layer 400 at the first edge along a first direction 451 and can enter the fluid control film layer 400 at a second edge along a second direction 452. As another example, the first opening may be located on a first edge 402 and the second opening may be located on an opposing edge 403. In some embodiments, the channel openings 440 are present on all four edges 401-404 of the fluid control film layer 400. This arrangement provides a plurality of openings 440 for droplets to enter the channels 430 and then disperse within the channels 430 of the fluid control film layer 400.

Figure 4B:
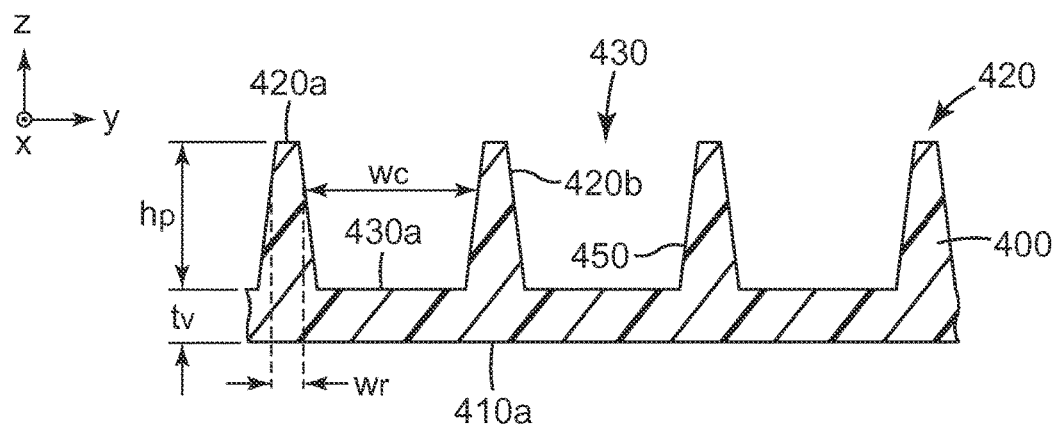
FIG. 4b illustrates a cross section of the fluid control film layer of an exemplary embodiment.

FIG. 4b illustrates a cross section of fluid control film layer 400. The channels 430 of the fluid control film layer 400 are defined by first and second ridges 420 disposed on either side of the channel 430. As shown in FIG. 4b, in some embodiments the ridges 420 can extend along the z-axis, generally normal to the bottom surface 430a of the channel 430. Alternatively, in some embodiments, the ridges can extend at a non-perpendicular angle with respect to the bottom surface of the channel. The first and second primary ridges 420 have a height $h_p$ that is measured from the bottom surface 430a of the channel 430 to the top surface 420a of the ridges 420. The ridge height $h_p$ may be selected to provide durability and protection to the fluid control film layer 400. In some embodiments, the ridge height $h_p$ is about 25 micrometers to about 3000 micrometers, the cross sectional channel width, $w_c$, is about 25 micrometers to about 3000 micrometers, and the cross sectional ridge width, $w_r$, is about 30 micrometers to about 250 micrometers.

In some embodiments, as shown in FIG. 4b, the side surfaces 420b of the channels 430 may be sloped in cross section so that the width of the ridge at the bottom surface 430a of the channel is greater than the width of the ridge at the top surface 420a of the ridges 420. In this scenario, the width of the channel 430 at the bottom surface 430a of the channel is less than the width of the channel 430 at the top surface 420a of the ridges 420. Alternatively, the side surfaces of the channels could be sloped so that the channel width at the bottom surface of the channel is greater than the channel width at the top surface of the ridges.

The fluid control film layer 400 has a thickness $t_v$ measured from the bottom surface 410a of the fluid control film layer 400 to the bottom surface of the channel 430a. The thickness $t_v$ can be selected to allow liquid droplets to be wicked into the fluid control film layer 400 but still maintain a robust structure. In some embodiments, the fluid control film layer thickness $t_v$ is less than about 75 micrometers thick, or between about 20 micrometers to about 200 micrometers. A hydrophilic coating 450 may be disposed, e.g., plasma deposited, on the microstructured surface of the fluid control film layer 400.

Figure 5A:
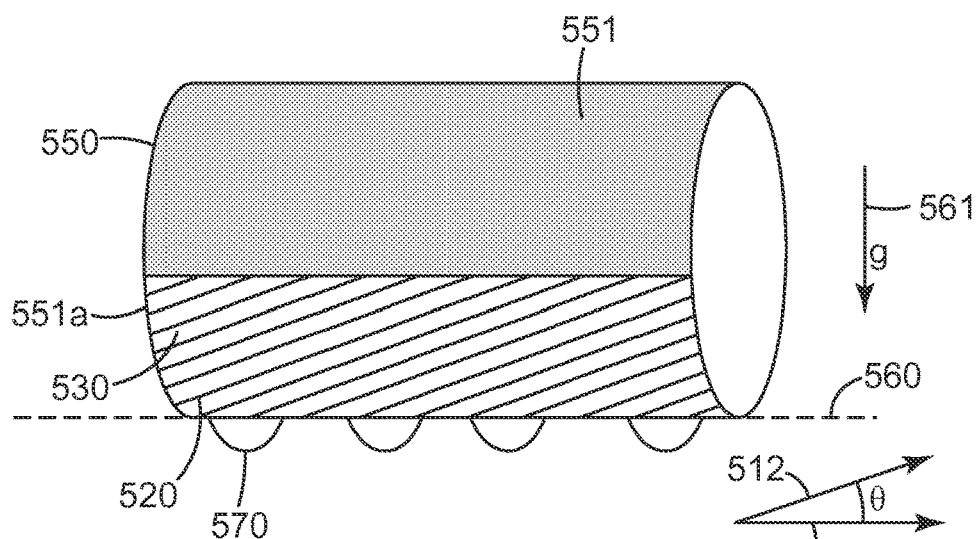
FIGS. 5a and 5b illustrate side and bottom views, respectively, of a structure with a plurality of channels disposed thereon, the channels running along an axis that makes an angle of less than 45 degrees with respect to the longitudinal axis of the structure according to an example embodiment.
Figure 5B:
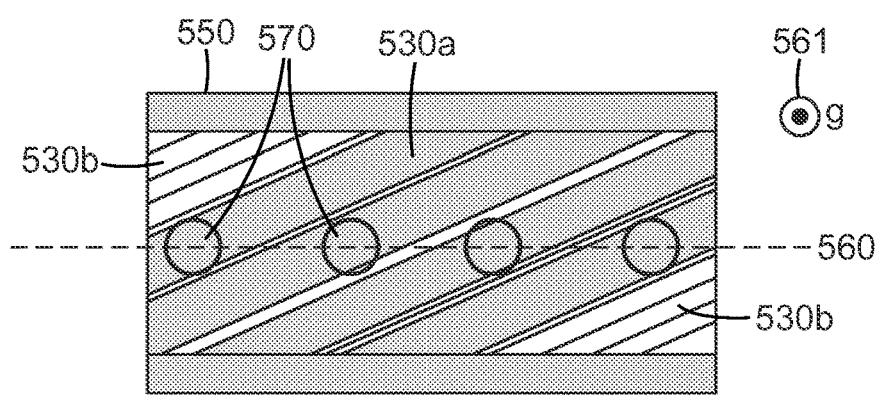

In certain embodiments, fluid control films according to the present disclosure may be attached to an outer surface of a structure and extend along a longitudinal axis of the outer surface, wherein the channel longitudinal axis makes an angle between 0 and 90 degrees with respect to the longitudinal axis of the outer surface. For instance, FIG. 5a is a side view and FIG. 5b is a bottom view of a pipe structure 550 having an outer surface 551 with fluid control features 530 disposed on a bottom portion 551a of the outer surface 551 of the structure 550, wherein the bottom portion 551a and top portion are so named due to their orientation with respect to the direction of gravitational force, g, 561. Fluid dispersing channels 530 defined by ridges 520 run along a channel axis 512 that is angled at angle θ with respect to the longitudinal axis 511 of the structure 550.

The outer surface 551 is associated with a nadir line, illustrated by dashed line 560, which is the line that connects the bottommost points of the outer surface 551. In the illustrated embodiment, the nadir line 560 is substantially parallel to the longitudinal axis 511 of the structure. A number of the channels 530 intersect the nadir line 560 due to their alignment along the channel axis 512 which intersects the longitudinal axis 511.

Each channel is associated with a certain saturation capacity or volume. FIG. 5b shows a number of fluid control channels 530a that are saturated with liquid and a number of fluid control channels 530b that are unsaturated. When the amount of fluid in a fluid control channel 530a exceeds the capacity of a channel, the channel is saturated and any liquid in excess of the channel capacity will collect as a droplet 570 along the nadir line 560. If fluid continues to collect in the droplet, the droplet may become so large that the gravitational force pulls the droplet away from the fluid control surface. As shown in FIGS. 5a and 5b, the liquid droplets 570 are disposed across the saturated channels 530a along the nadir line 560. For example, the droplets may be relatively evenly spaced along the bottom surface of the structure due to the arrangement of the channels.

Fluid control channels that are angled with respect to the nadir line, as shown in the embodiment of FIGS. 5a and 5b, provided for droplet formation in many channels. In contrast, in fluid control surfaces having channels that are closely aligned with the longitudinal axis of the structure, i.e., for θ equal to or approaching 0 degrees, only one or only a few channels are disposed along or near the nadir line 560. A relatively large number of channels intersecting the nadir line produces greater overall fluid holding capacity of the fluid control surface. Each of the channels is designed to disperse the fluid along the channel by wicking. Thus, embodiments employing angled channels engage more channels at the nadir line, providing greater fluid containing capacity, resulting in smaller volume droplets of excess fluid and/or reducing droplet detachment. Smaller volume droplets evaporate more quickly and reduce droplet detachment resulting in less contamination from condensing liquids.

Fluid control film layers having channels that are angled with respect to the longitudinal axis of the convex surface i.e., along the nadir line of a pipe, as shown in FIGS. 5a and 5b, can have increased acquisition of fluid along the edges of the film when compared with the edge acquisition of fluid control surfaces having channels that are substantially parallel with the longitudinal axis of outer surface. For example, consider the scenario wherein water droplets condense on the outer surface of a pipe and run down the pipe towards the nadir line. When a fluid control film layer or surface is present along a lower portion of the pipe, the condensed droplets encounter an edge of a fluid control surface. If the fluid control surface has channels at the edge that are closely aligned with the nadir line, the droplets are impeded from entering the fluid control surface by a ridge near the edge that runs along the nadir line. Thus, ridge impedes edge acquisition of fluid into the fluid control channels and the droplets can become "pinned" at the edge by the ridge. In contrast, if the fluid control surface includes channels that are angled with respect to the nadir line as disclosed herein, the edge includes a number of channel openings that enhance edge acquisition of the fluid.

A configuration wherein the angle between the channel axis and the longitudinal axis of the structure is equal to or approaching 90 degrees engages many channels along the nadir line 560 of the structure during saturation of the fluid control surface. However, the gravitational force component that must be overcome by capillary force to move liquid in a direction towards the top of the structure (along arrow 599) by wicking is increased when compared channels that make a shallower angle, e.g., less than 45 degrees, with respect to the longitudinal axis of the structure. Thus, fluid control surfaces having channels angled at less than 45 degrees with respect to the longitudinal axis are capable of dispersing fluid a greater amount of fluid when compared to similarly structured channels that are oriented at 90 degrees with respect to the longitudinal axis of the structure.

Arranging the fluid control channels at an angle to a pipe's outer surface can be accomplished by various techniques. For example, a fluid control film layer that includes the fluid control channels may be affixed to the pipe by adhering or otherwise affixing the fluid control film layer to the outer surface of the pipe. In some embodiments, the fluid control film layer is part of a tape, which an adhesive layer disposed on the surface of the fluid control film layer opposite to the fluid control channels. Suitable techniques for forming a fluid control film layer useful for tape implementations include extrusion, embossing, laser cutting, and/or thermosetting. In some implementations, the channels run along an axis that makes an angle less than 45 degrees with the longitudinal axis of the tape. In these implementations installation of the tape on the pipe can involve applying at least a strip of the tape along the nadir line of the pipe. In some implementations, where the channels run parallel to the longitudinal axis of the tape, the tape itself can be disposed at an angle less than 45 degrees on the pipe, e.g., by spiral wrapping the fluid control tape around the pipe.

In some (non-tape) implementations, the fluid control channels may be formed directly on the outer surface pipe, e.g., during manufacture of the pipe, or may be formed on a layer deposited on the pipe outer surface. Suitable techniques for forming a pipe having a fluid control film layer on the outer surface include knurling, embossing, hot lamination, and the like.

The microchannels described herein may be replicated in a predetermined pattern that form a series of individual open capillary channels that extending along a major surface of the fluid control film layer. These microreplicated channels formed in sheets or films are generally uniform and regular along substantially each channel length, for example from channel to channel. The film or sheet may be thin, flexible, cost effective to produce, can be formed to possess desired material properties for its intended application and can have, if desired, an attachment means (such as adhesive) on one side thereof to permit ready application to a variety of surfaces in use.

The fluid control film layers discussed herein are capable of spontaneously transporting fluids along the channels by capillary action. Two general factors that influence the ability of fluid control film layers to spontaneously transport fluids are (i) the geometry or topography of the surface (capillarity, size and shape of the channels) and (ii) the nature of the film surface (e.g., surface energy). To achieve the desired amount of fluid transport capability the designer may adjust the structure or topography of the fluid control film and/or adjust the surface energy of the fluid control film surface. In order for a channel to function for fluid transport by spontaneous wicking by capillary action, the channel is generally sufficiently hydrophilic to allow the fluid to wet the surfaces of the channel with a contact angle between the fluid and the surface of the fluid control film layer equal or less than 90 degrees.

In some implementations, the fluid control films described herein can be prepared using an extrusion embossing process that allows continuous and/or roll-to-roll film fabrication. According to one suitable process, a flowable material is continuously brought into line contact with a molding surface of a molding tool. The molding tool includes an embossing pattern cut into the surface of the tool, the embossing pattern being the microchannel pattern of the fluid control film in negative relief. A plurality of microchannels is formed in the flowable material by the molding tool. The flowable material is solidified to form an elongated fluid control film that has a length along a longitudinal axis and a width, the length being greater than the width. The microchannels can be formed along a channel longitudinal axis that makes an angle that is greater than 0 and less than 90 degrees with respect to the longitudinal axis of the film. In some embodiments, the angle is less than 45 degrees, for example.

The flowable material may be extruded from a die directly onto the surface of the molding tool such that flowable material is brought into line contact with the surface of molding tool. The flowable material may comprise, for example, various photocurable, thermally curable, and thermoplastic resin compositions. The line contact is defined by the upstream edge of the resin and moves relative to both molding tool and the flowable material as molding tool rotates. The resulting fluid control film may be a single layer article that can be taken up on a roll to yield the article in the form of a roll good. In some implementations, the fabrication process can further include treatment of the surface of the fluid control film that bears the microchannels, such as plasma deposition of a hydrophilic coating as disclosed herein. In some implementations, the molding tool may be a roll or belt and forms a nip along with an opposing roller. The nip between the molding tool and opposing roller assists in forcing the flowable material into the molding pattern. The spacing of the gap forming the nip can be adjusted to assist in the formation of a predetermined thickness of the fluid control film. Additional information about suitable fabrication processes for the disclosed fluid control films are described in commonly owned U.S. Pat. Nos. 6,375,871 and 6,372,323, each of which is incorporated by reference herein in its respective entirety.

The fluid control films discussed herein can be formed from any polymeric materials suitable for casting or embossing including, for example, polyolefins, polyesters, polyamides, poly(vinyl chloride), polyether esters, polyimides, polyesteramide, polyacrylates, polyvinylacetate, hydrolyzed derivatives ofpolyvinylacetate, etc. Specific embodiments use polyolefins, particularly polyethylene or polypropylene, blends and/or copolymers thereof, and copolymers of propylene and/or ethylene with minor proportions of other monomers, such as vinyl acetate or acrylates such as methyl and butylacrylate. Polyolefins readily replicate the surface of a casting or embossing roll. They are tough, durable and hold their shape well, thus making such films easy to handle after the casting or embossing process. Hydrophilic polyurethanes have physical properties and inherently high surface energy. Alternatively, fluid control films can be cast from thermosets (curable resin materials) such as polyurethanes, acrylates, epoxies and silicones, and cured by exposure radiation (e.g., thermal, UV or E-beam radiation, etc.) or moisture. These materials may contain various additives including surface energy modifiers (such as surfactants and hydrophilic polymers), plasticizers, antioxidants, pigments, release agents, antistatic agents and the like. Suitable fluid control films also can be manufactured using pressure sensitive adhesive materials. In some cases the channels may be formed using inorganic materials (e.g., glass, ceramics, or metals). Generally, the fluid control film substantially retains its geometry and surface characteristics upon exposure to fluids. Additional information regarding materials suitable for microchannel fluid control films discussed herein is described in commonly owned U.S. Patent Publication 2005/0106360, which is incorporated herein by reference.

The surface of the film is modified to ensure sufficient capillary forces. More particularly, the surface is modified in order to ensure it is sufficiently hydrophilic. The films generally may be modified (e.g., by surface treatment, application of surface coatings or agents), such that the film surface is rendered hydrophilic so as to exhibit a contact angle of 45° or less with aqueous fluids. Any suitable known method may be utilized to achieve a hydrophilic surface on fluid control films of the present disclosure. Surface treatments may be employed such as plasma treatment, vacuum deposition, polymerization of hydrophilic monomers, grafting hydrophilic moieties onto the film surface, corona or flame treatment, etc. For certain embodiments, the hydrophilic surface treatment comprises a zwitterionic silane, and for certain embodiments, the hydrophilic surface treatment comprises a non-zwitterionic silane. Non-zwitterionic silanes include a non-zwitterionic anionic silane, for instance.

Non-zwitterionic silane include for example and without limitation, a non-zwitterionic EDTA-functional silane, and a non-zwitterionic sulfonic acid alcohol-functional silane, for instance non-zwitterionic sulfonate-organosilanol compounds such as those disclosed in U.S. Pat. No. 4,152,165 (Langager et al.) and U.S. Pat. No. 4,338,377 (Beck et al.).

Suitable zwitterionic silanes include a zwitterionic sulfonate-functional silane, a zwitterionic carboxylate-functional silane, a zwitterionic phosphate-functional silane, a zwitterionic phosphonic acid-functional silane, a zwitterionic phosphonate-functional silane, or a combination thereof. In certain embodiments, the zwitterionic silane compounds used in the present disclosure have the following Formula (I) wherein:

$$(R^1O)_p\text{—}Si(Q^1)_q\text{—}W\text{—}N^+(R^2)(R^3)\text{—}(CH_2)_m\text{—}Z^{t-} \quad (I)$$

wherein:
each $R^1$ is independently a hydrogen, methyl group, or ethyl group;
each $Q^1$ is independently selected from hydroxyl, alkyl groups containing from 1 to 4 carbon atoms, and alkoxy groups containing from 1 to 4 carbon atoms;
each $R^2$ and $R^3$ is independently a saturated or unsaturated, straight chain, branched, or cyclic organic group (preferably having 20 carbons or less), which may be joined together, optionally with atoms of the group W, to form a ring;
W is an organic linking group;
$Z^{t-}$ is $\text{—}SO_3^-$, $\text{—}CO_2^-$, $\text{—}OPO_3^{2-}$, $\text{—}PO_3^{2-}$, $\text{—}OP(\!=\!O)(R)O^-$, or a combination thereof, wherein t is 1 or 2, and R is an aliphatic, aromatic, branched, linear, cyclic, or heterocyclic group (preferably having 20 carbons or less, more preferably R is aliphatic having 20 carbons or less, and even more preferably R is methyl, ethyl, propyl, or butyl);
p and m are integers of 1 to 10 (or 1 to 4, or 1 to 3);
q is 0 or 1; and
p+q=3.

In certain embodiments, the organic linking group W of Formula (I) may be selected from saturated or unsaturated, straight chain, branched, or cyclic organic groups. The linking group W is preferably an alkylene group, which may include carbonyl groups, urethane groups, urea groups, heteroatoms such as oxygen, nitrogen, and sulfur, and combinations thereof. Examples of suitable linking groups W include alkylene groups, cycloalkylene groups, alkyl-substituted cycloalkylene groups, hydroxy-substituted alkylene groups, hydroxy-substituted mono-oxa alkylene groups, divalent hydrocarbon groups having mono-oxa backbone substitution, divalent hydrocarbon groups having mono-thia backbone substitution, divalent hydrocarbon groups having monooxo-thia backbone substitution, divalent hydrocarbon groups having dioxo-thia backbone substitution, arylene groups, arylalkylene groups, alkylarylene groups and substituted alkylarylene groups.

Suitable examples of zwitterionic compounds of Formula (I) are described in U.S. Pat. No. 5,936,703 (Miyazaki et al.) and International Publication Nos. WO 2007/146680 and WO 2009/119690, and include the following zwitterionic functional groups ($\text{—}W\text{—}N^+(R^3)(R^4)\text{—}(CH_2)_m\text{—}SO_3^-$):

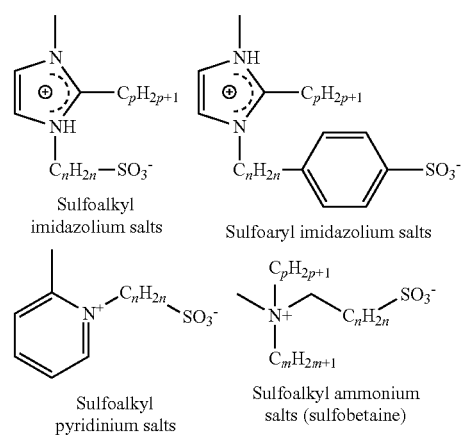

Sulfoalkyl imidazolium salts

Sulfoaryl imidazolium salts

Sulfoalkyl pyridinium salts

Sulfoalkyl ammonium salts (sulfobetaine)

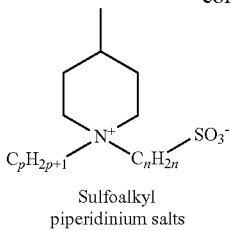

Sulfoalkyl
piperidinium salts

Suitable examples of zwitterionic silanes are described in U.S. Pat. No. 5,936,703 (Miyazaki et al.), including, for example:

(CH$_3$O)$_3$Si—CH$_2$CH$_2$CH$_2$—N$^+$(CH$_3$)$_2$—CH$_2$CH$_2$CH$_2$CH—SO$_3^-$; and (CH$_3$CH$_2$O)$_2$Si(CH$_3$)—CH$_2$CH$_2$CH$_2$—N$^+$(CH$_3$)$_2$—CH$_2$CH$_2$CH$_2$—SO$_3^-$.

Other examples of suitable zwitterionic silanes, which can be made using standard techniques that are exemplified in U.S. Application Publication No. 2012/0273000 (Jing et al.), include the following:

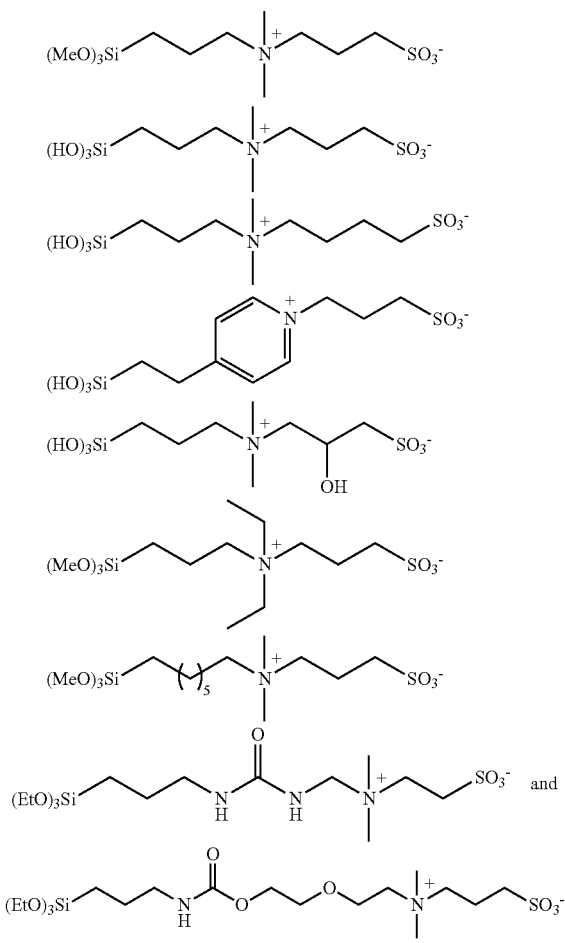

Preferred examples of suitable zwitterionic sulfonate-functional silane compounds for use in the present disclosure are described in the Experimental Section. A particularly preferred zwitterionic sulfonate-functional silane is:

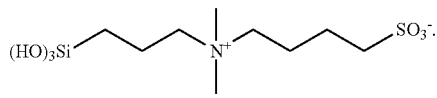

An example of a zwitterionic carboxylate-functional silane compound includes:

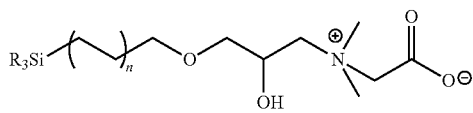

wherein each R is independently OH or alkoxy, and n is an integer of 1 to 10. An example of a zwitterionic phosphate-functional silane compound includes:

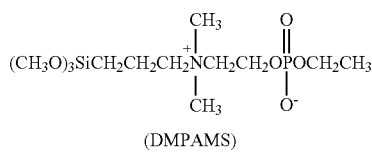

(DMPAMS)

(N,N-dimethyl, N-(2-ethyl phosphate ethyl)-aminopropyl-trimethyoxysilane (DMPAMS)). An example of a zwitterionic phosphonate-functional silane compound includes:

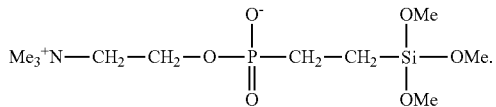

In certain embodiments, the non-zwitterionic silanes used according to the present disclosure have the following Formula (II):

$$[(MO)(Q^2)_n Si(XCH_2 V^{t-})_{3-n}]Y_{2/nr}^{+r} \quad (II)$$

wherein:

each $Q^2$ is independently selected from hydroxyl, alkyl groups containing from 1 to 4 carbon atoms, and alkoxy groups containing from 1 to 4 carbon atoms;

M is selected from hydrogen, alkali metals, and organic cations of strong organic bases having an average molecular weight of less than 150 and a pKa of greater than 11;

X is an organic linking group;

$V^{t-}$ is —SO$_3^-$, —CO$_2^-$, —[OCH$_2$CH$_2$]nO$^-$, or a combination thereof, wherein t is 1 or 2, and n is an integer of 1 to 10;

Y is selected from hydrogen, alkaline earth metals (e.g., magnesium, calcium, etc.), organic cations of protonated weak bases having an average molecular weight of less than 200 and a pKa of less than 11 (e.g., 4-aminopyridine, 2-methoxyethylamine, benzylamine, 2,4-dimethylimidazole, 3-[2-ethoxy(2-ethoxyethoxy)]propylamine), alkali metals, and organic cations of strong organic bases having an average molecular weight of less than 150 and a pKa of greater than 11 (e.g., $^+$N(CH$_3$)$_4$, $^+$N(CH$_2$CH$_3$)$_4$), provided that M is hydrogen when Y is selected from hydrogen, alkaline earth metals and organic cations of said protonated weak bases;

r is equal to the valence of Y; and n is 1 or 2.

Preferably, the non-zwitterionic anionic compound of Formula (II) is an alkoxysilane compound (e.g., wherein $Q^2$ is an alkoxy group containing from 1 to 4 carbon atoms).

The weight percentage of oxygen in these compounds of Formula (II) is at least 30%, or at least 40%. Preferably, it is in the range of 45% to 55%. The weight percentage of silicon in these compounds is no greater than 15%. Each of these percentages is based on the weight of the compound in the water-free acid form.

In certain embodiments, the organic linking group X of Formula (II) may be selected from alkylene groups, cycloalkylene groups, alkyl-substituted cycloalkylene groups, hydroxy-substituted alkylene groups, hydroxy-substituted mono-oxa alkylene groups, divalent hydrocarbon groups having mono-oxa backbone substitution, divalent hydrocarbon groups having mono-thia backbone substitution, divalent hydrocarbon groups having monooxo-thia backbone substitution, divalent hydrocarbon groups having dioxo-thia backbone substitution, arylene groups, arylalkylene groups, alkylarylene groups and substituted alkylarylene groups. Preferably, X is selected from alkylene groups, hydroxy-substituted alkylene groups and hydroxy-substituted mono-oxa alkylene groups.

Sulfonate-functional silane compounds have an alkoxysilane- and/or silanol-functional group (which can bond to a substrate surface) and a sulfonate group ($-SO_3^-$) (which can render a substrate surface hydrophilic). Examples include non-zwitterionic sulfonate-functional silane compounds such as those disclosed in U.S. Pat. No. 4,152,165 (Langager et al.) and U.S. Pat. No. 4,338,377 (Beck et al.), and include, for example, the following:

(HO)$_3$Si—CH$_2$CH$_2$CH$_2$—O—CH$_2$—CH(OH)—CH$_2$SO$_3^-$H$^+$;
(HO)$_3$Si—CH$_2$CH(OH)—CH$_2$SO$_3^-$H$^+$;
(HO)$_3$Si—CH$_2$CH$_2$CH$_2$SO$_3^-$H$^+$;
(HO)$_3$Si—C$_6$H$_4$—CH$_2$CH$_2$SO$_3^-$H$^+$;
(HO)$_2$Si—[CH$_2$CH$_2$SO$_3^-$H$^+$]$_2$;
(HO)—Si(CH$_3$)$_2$—CH$_2$CH$_2$SO$_3^-$H$^+$;
(NaO)(HO)$_2$Si—CH$_2$CH$_2$CH$_2$—O—CH$_2$—CH(OH)—CH$_2$SO$_3^-$Na$^+$; and
(HO)$_3$Si—CH$_2$CH$_2$SO$_3^-$K$^+$.

Polyethylene glycol-functional silane compounds have an alkoxysilane- and/or silanol-functional group (which can bond to a substrate surface) and a polyethylene glycol group ($-[OCH_2CH_2]nO^-$); wherein n can be an integer of 1 to 10. An example includes 2-[methoxy(polyethyleneoxy)6-9propyl]trimethyoxysilane, commercially available from Gelest.

Carboxylate-functional silane compounds have an alkoxysilane- and/or silanol-functional group (which can bond to a substrate surface) and a carboxylate group ($-CO_2^-$) (which can render a substrate surface hydrophilic). Examples include non-zwitterionic carboxylate-functional silane compounds, such as those commercially available from multiple vendors, including, for example, Dow and Gelest. In certain embodiments, the non-zwitterionic carboxylate-containing compounds used in compositions of the present disclosure include:

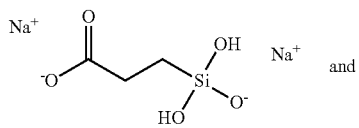

and

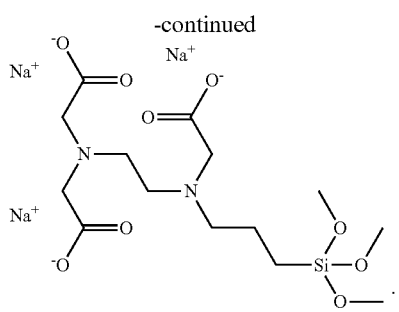

Surprisingly, it has been discovered that when non-zwitterionic EDTA silane hydrophilic surface treatment is covalently bonded to at least a portion of the microchannels from an acidic solution, it provides a significantly better easy clean surface than non-zwitterionic EDTA silane hydrophilic surface treatment is covalently bonded from a basic solution.

In some embodiments, the fluid control film layer may include a characteristic altering additive. Examples of additives include flame retardants, hydrophobics, hydrophilics, antimicrobial agents, inorganics, corrosion inhibitors, metallic particles, glass fibers, fillers, clays and nanoparticles.

Optionally, a surfactant or other suitable agent may also be blended with the resin as an internal characteristic altering additive at the time of film extrusion. Typically, a surfactant is incorporated in the polymeric composition from which the fluid control film is made. An illustrative example of a surfactant that can be incorporated in polyethylene fluid control films is TRITON™ X-100 (available from Union Carbide Corp., Danbury, Conn.), an octylphenoxypolyethoxyethanol nonionic surfactant, e.g., used at between about 0.1 and 0.5 weight percent. Other surfactant materials that are suitable for increased durability requirements for building and construction applications of the present disclosure include POLYSTEP B22 (available from Stepan Company, Northfield, Ill.) and TRITON™ X-35 (available from Union Carbide Corp., Danbury, Conn.). A surfactant or mixture of surfactants may be impregnated into the article in order to adjust the properties of the fluid control film or article.

Alternatively, a hydrophilic monomer may be added to the article and polymerized in situ to form an interpenetrating polymer network. For example, a hydrophilic acrylate and initiator could be added and polymerized by heat or actinic radiation. Suitable hydrophilic polymers include: homo and copolymers of ethylene oxide; hydrophilic polymers incorporating vinyl unsaturated monomers such as vinylpyrrolidone, carboxylic acid, sulfonic acid, or phosphonic acid functional acrylates such as acrylic acid, hydroxy functional acrylates such as hydroxyethylacrylate, vinyl acetate and its hydrolyzed derivatives (e.g. polyvinylalcohol), acrylamides, polyethoxylated acrylates, and the like; hydrophilic modified celluloses, as well as polysaccharides such as starch and modified starches, dextran, and the like.

In certain embodiments, the hydrophilic surface treatment further comprises at least one silicate, for example and without limitation, comprising lithium silicate, sodium silicate, potassium silicate, silica, tetraethylorthosilicate, poly(diethoxysiloxane), or a combination thereof. One or more silicates may be mixed into a solution containing the hydrophilic silane compounds, for application to a structured surface.

In certain embodiments, a siliceous primer is disposed on at least a portion of the surface of the fluid control channels. In such embodiments, the hydrophilic surface treatment is bonded to the surface of the microchannels via the siliceous primer. For example and without limitation, the hydrophilic surface treatment may be bonded to the surface of a fluid control film by contacting the fluid control film with a solution containing one or more hydrophilic silane compounds for at least 48 hours, followed by rinsing with water and drying under ambient conditions. The hydrophilic surface treatment is contacted with the surface of a fluid control film by, for instance coating a composition containing hydrophilic silane compounds on the article using conventional techniques, such as bar, roll, curtain, rotogravure, spray, or dip coating techniques, or by submerging the fluid control film in the composition.

Suitable siliceous primers include for example and without limitation, a siliceous primer comprising a plurality of acid-sintered interconnected silica nanoparticles arranged to form a continuous three-dimensional porous network and a silicon-containing material associatively bonded to the fluid control channels. The siliceous primer is attached to at least a portion of the surface of the fluid control channels.

In certain embodiments, a nanoparticle-containing primer coating composition (for forming a siliceous primer comprising a plurality of acid-sintered interconnected silica nanoparticles) includes an aqueous dispersion having a pH of less than 5 comprising silica nanoparticles having average particle diameters of 40 nanometers or less, and an acid having a pKa of ≤3.5 (preferably <2.5, most preferably less than 1). These acidified silica nanoparticle primer coating compositions can be coated directly onto hydrophobic organic and inorganic substrates without either organic solvents or surfactants. The wetting property of these inorganic nanoparticle aqueous dispersions on hydrophobic surfaces such as polyethylene terephthalate (PET) or polycarbonate (PC) is a function of the pH of the dispersions and the pKa of the acid. The primer coating compositions are coatable on hydrophobic organic substrates when they are acidified with HCl to pH=2 to 3, and even to 5 in some embodiments. In contrast, the primer coating compositions bead up on the organic substrates at neutral or basic pH.

Inorganic silica sols in aqueous media are well known in the art and available commercially. Silica sols in water or water-alcohol solutions are available commercially under such trade names as LUDOX (manufactured by E.I. duPont de Nemours and Co., Inc., Wilmington, Del.), NYACOL (available from Nyacol Co., Ashland, Mass.) or NALCO (manufactured by Ondea Nalco Chemical Co., Oak Brook, Ill.). One useful silica sol is NALCO 2326 available as a silica sol with mean particle size of 5 nanometers, pH 10.5, and solid content 15% by weight. Other commercially available silica nanoparticles include "NALCO 1115" and "NALCO 1130," commercially available from NALCO Chemical Co., "Remasol SP30," commercially available from Remet Corp., and "LUDOX SM," commercially available from E.I. Du Pont de Nemours Co., Inc., and Snowtex ST-OUP, Snowtex ST-UP, Snowtex ST-PS-S available from Nissan Chemical Co.

Non-aqueous silica sols (also called silica organosols) may also be used and are silica sol dispersions wherein the liquid phase is an organic solvent, or an aqueous organic solvent. In the practice of this disclosure, the silica sol is chosen so that its liquid phase is typically aqueous or an aqueous organic solvent. However, it has been observed that sodium stabilized silica nanoparticles should first be acidified prior to dilution with an organic solvent such as ethanol. Dilution prior to acidification may yield poor or non-uniform coatings. Ammonium stabilized silica nanoparticles may generally be diluted and acidified in any order.

The primer coating composition contains an acid or combination of acids, each having a pKa ($H_2O$) of ≤3.5, preferably <2.5, most preferably less than 1. Useful acids include both organic and inorganic acids and may be exemplified by oxalic acid, citric acid, $H_2SO_3$, $H_3PO_4$, $CF_3CO_2H$, HCl, HBr, HI, $HBrO_3$, $HNO_3$, $HClO_4$, $H_2SO_4$, $CH_3SO_3H$, $CF_3SO_3H$, $CF_3CO_2H$, and $CH_3SO_2OH$. Most preferred acids include HCl, $HNO_3$, $H_2SO_4$, and $H_3PO_4$. In some embodiments, it is desirable to provide a mixture of an organic and inorganic acid. In some embodiments one may use a mixture of acids comprising those having a pKa ≤3.5 (preferably <2.5, most preferably less than 1), optionally with minor amounts of other acids having pKa's >0. It has been found that weaker acids having a pKa of >4, such as acetic acid, do not provide a uniform coatings having the desirable properties of transmissivity, cleanability, and/or durability. In particular, primer coating compositions with weaker acids such as acetic acid typically bead up on the surface of a substrate.

The primer coating composition generally contains sufficient acid to provide a pH of less than 5, preferably less than 4, most preferably less than 3. In some embodiments, it has been found that the pH of the coating composition can be adjusted to pH 5-6 after reducing the pH to less than 5. This allows one to coat pH-sensitive substrates.

Tetraalkoxy coupling agents, particularly tetraalkoxysilanes, such as tetraethylorthosilicate (TEOS), and oligomeric forms of tetraalkoxysilane, such as alkyl polysilicates (e.g., poly(diethoxysiloxane)), may also be useful to improve binding between silica nanoparticles. The optimal amount of coupling agent is determined experimentally and is dependent on the coupling agent's identity, molecular weight and refractive index. The coupling agent(s), when present, are typically added to the composition at levels of 0.1 to 50 percent by weight (wt-%) of the silica nanoparticle concentration, and more preferably 1 to 15 percent by weight of the silica nanoparticles.

In one embodiment, the particles preferably have an average primary particle size of 40 nanometers or less, preferably 20 nanometers or less, and more preferably 10 nanometers or less. The smaller nanoparticles, those of 20 nanometers or less, generally provide better primer coatings, when acidified, without the need for additives such as tetraalkoxysilanes, surfactants or organic solvents. Further, the nanoparticles generally have a surface area greater than 150 $m^2$/gram, preferably greater than 200 $m^2$/gram, and more preferably greater than 400 $m^2$/gram. The particles preferably have narrow particle size distributions, that is, a polydispersity (i.e., particle size distribution) of 2.0 or less, preferably 1.5 or less. If desired, larger silica particles may be added, in amounts that do not deleteriously decrease the coatability of the composition on a selected substrate.

In another embodiment, the particles preferable have at least a bimodal distribution with a silica nanoparticles having average particle diameters of 40 nanometers or less and silica nanoparticles having average particle diameters of greater than 50 nanometers. The silica nanoparticles may have average particle diameters up to 500 nanometers. In one embodiment, the bimodal distribution of silica nanoparticles has a first distribution in a range from 2 nanometers to 15 nanometers and a second distribution in a range from 20 nanometers to 500 nanometers; a first distribution in a range from 2 nanometers to 20 nanometers and a second distribution in a range from 30 nanometers to 500 nanometers or even a first distribution in a range from 5 nanometers to 15 nanometers and a second distribution in a range from 20 nanometers to 100 nanometers. In another aspect, in some embodiments, the weight ratio of the first distribution of nanoparticles to the second distribution of nanoparticles is in a range from 1:99 to 99:1; 10:90 to 90:10; 20:80 to 80:20; or even 30:70 to 70:30. In one embodiment, the weight ratio of the first distribution of nanoparticles to the second distribution of nanoparticles is in a range from 1:99 to 99:1.

The nanosilica described in this disclosure may be spherical or nonspherical. The silica nanoparticles are preferably not surface modified. The average particle size may be determined using transmission electron microscopy. As used herein, the term "continuous" refers to covering the surface of the substrate with virtually no discontinuities or gaps in the areas where the gelled network is applied. The term "network" refers to an aggregation or agglomeration of nanoparticles linked together to form a porous three-dimensional network. The term agglomerates as used herein refers to linking together (or sintering) of the nanoparticles as shown and described in FIG. 1 of WO 2009/140482. The term "primary particle size" refers to the average size of unagglomerated single particles of silica.

The term "porous" refers to the presence of voids between the silica nanoparticles created when the nanoparticles form a continuous coating. Preferably, the network has a porosity of 25 to 45 volume percent, more preferably 30 to 40 volume percent, when dried. In some embodiments the porosity may be higher. Porosity may be calculated from the refractive index of the coating according to published procedures such as in W. L. Bragg, A. B. Pippard, Acta Crystallographica, volume 6, page 865 (1953). Primer coating layer thicknesses may be higher, e.g., as high as a few micrometers or mils thick, depending on the application, such as for easy-clean of removal of undesired particulates.

Primer coating compositions are preferably coated on the article using conventional techniques, such as bar, roll, curtain, rotogravure, spray, or dip coating techniques. The preferred methods include bar and roll coating, or air knife coating to adjust thickness. In order to ensure uniform coating and wetting of the film, it may be desirable to oxidize the substrate surface prior to coating using corona discharge or flame treatment methods.

The primer coatings of the present disclosure are preferably applied in uniform average thicknesses varying by less than 200 Å, and more preferably by less than 100 Å. The optimal average dry coating thickness is dependent upon the particular primer coating composition, but in general the average thickness of the coating is 100 Å to 10,000 Å, preferably 500 to 2500 Å, more preferably 750 to 2000 Å, and even more preferably 1000 to 1500 Å, as measured using an ellipsometer such as a Gaertner Scientific Corp Model No. L115C. It should be noted, however, that while the average coating thickness is preferably uniform, the actual coating thickness can vary considerably from one particular point on the coating to another. As illustrated in FIG. 2k, it is not necessary to completely coat all of the surfaces of channels of a structured surface (i.e., fluid control film).

Once coated, the primed article is typically dried at temperatures of 20° C. to 150° C. in a recirculating oven. An inert gas may be circulated. After the primer coating composition is applied to the substrate and dried, the coating comprises preferably from 60 to 95 percent by weight (more preferably from 70 to 92 percent by weight) of agglomerated acid-sintered silica nanoparticles and from 0.1 to 20 percent by weight (more preferably from 10 to 25 percent by weight) tetraalkoxysilanes.

Hence, in certain embodiments, applying a siliceous primer to a fluid control film comprises contacting at least a portion of the surface of the plurality of microchannels with a nanoparticle-containing coating composition, and drying the nanoparticle-containing coating composition to provide the siliceous primer on at least a portion of the surface of the plurality of microchannels. The nanoparticle-containing coating composition comprises an aqueous dispersion having a pH of less than 5 comprising silica nanoparticles having average particle diameters of 40 nanometers or less, and an acid having a pKa of less than or equal to 3.5.

In some embodiments, a silicon-containing primer may be deposited on the surface of the fluid control film layer by plasma deposition, which may occur in a batch-wise process or a continuous process. As used herein, the term "plasma" means a partially ionized gaseous or fluid state of matter containing reactive species which include electrons, ions, neutral molecules, free radicals, and other excited state atoms and molecules.

In general, plasma deposition involves moving the fluid control film through a chamber filled with one or more gaseous silicon-containing compounds at a reduced pressure (relative to atmospheric pressure). Power is provided to an electrode located adjacent to, or in contact with film. This creates an electric field, which forms a silicon-rich plasma from the gaseous silicon-containing compounds.

Ionized molecules from the plasma then accelerate toward the electrode and impact the surface of the fluid control film. By virtue of this impact, the ionized molecules react with, and bond to, the surface forming a primer layer. Temperatures for plasmas depositing the coating are relatively low. This is beneficial because high temperatures required for alternative deposition techniques (e.g., chemical vapor deposition) are known to degrade many materials suitable for fluid transfer films.

The extent of the plasma deposition may depend on a variety of processing factors, such as the composition of the gaseous silicon-containing compounds, the presence of other gases, the exposure time of the surface of the fluid control film layer to the plasma, the level of power provided to the electrode, the gas flow rates, and the reaction chamber pressure. These factors correspondingly help determine a thickness of primer layer.

The plasma may be of species including oxygen, nitrogen, nitrogen dioxide, nitrous oxide, ammonia, sulfur dioxide, silanes, siloxanes and organometallics. Exposure of the fluid control film layer to at least one plasma may be carried out in one step, two steps, or more. The primer layer may include one or more silicon-containing materials, such as silicon/oxygen materials, diamond-like glass (DLG) materials, and combinations thereof. Examples of suitable gaseous silicon-containing compounds for depositing layers of silicon/oxygen materials include silanes (e.g., $SiH_4$). Examples of suitable gaseous silicon-containing compounds for depositing layers of DLG materials include gaseous organosilicon compounds that are in a gaseous state at the reduced pressures of the reaction chamber. Examples of suitable organosilicon compounds include trimethylsilane, triethylsilane, trimethoxysilane, triethoxysilane, tetramethylsilane, tetraethylsilane, tetramethoxysilane, tetraethoxysilane, hexamethylcyclotrisiloxane, tetramethylcyclotetrasiloxane, tetraethylcyclotetrasiloxane, octamethylcyclotetrasiloxane, hexamethyldisiloxane, bistrimethylsilylmethane, and combinations thereof. An example of a particularly suitable organosilicon compound includes hexamethyldisiloxane and tetramethylsilane.

Hence, applying a siliceous primer optionally comprises forming a layer of silicon-containing materials covalently bonded to at least a portion of fluid control film microchannels by plasma deposition. In certain embodiments, the plasma deposition comprises use of a gaseous mixture of at least one silane-containing material and oxygen.

After completing a plasma deposition process with gaseous silicon-containing compounds, gaseous or vaporized non-organic compounds may continue to be used for plasma treatment to remove surface methyl groups from the deposited materials. This increases the percentage of silicon at the surface. One example of a particularly suitable non-organic compound is oxygen.

Additional information regarding materials and processes for applying a plasma coating to a fluid control film layer as discussed in this disclosure are described in commonly owned U.S. Patent Publication 2007/0139451, which is incorporated herein by reference.

The fluid transfer film may be provided as a roll good, in which exposure of its surface to at least one plasma is performed in continuous roll-to-roll fashion. Additional information on the equipment and processes for applying plasma deposited layers on continuous roll goods can be found in commonly owned U.S. Patent Publications 2003/134515 and 2005/0064275, which are incorporated herein by reference.

Generally, when a fluid control film according to the present disclosure is contacted with both a water and an oil, the fluid control film is preferentially water wet.

Surprisingly, certain functionalized structured surfaces retain at least some of their hydrophilicity following heat aging. In particular, the fluid control film provides a capillary rise of water after exposure to an elevated temperature of 150 degrees Fahrenheit (65.6 degrees Celsius) for four days of at least 15%, or at least 20%, or at least 25%, or at least 30%, or at least 35%, or at least 40%, or at least 45%, or at least 50%, or at least 55%, or at least 60%, or at least 65% of the capillary rise of water prior to the exposure to the elevated temperature. In contrast, as illustrated below in the Examples Section, fluid control films lacking hydrophilic surface treatment according to the present disclosure exhibit a capillary rise of water after exposure to an elevated temperature of 150 degrees Fahrenheit (65.6 degrees Celsius) for four days of up to 5%, or up to 7%, or up to 10%, or up to 12% of the capillary rise of water prior to the exposure to the elevated temperature.

In a third aspect, a process for cleaning a structured surface is provided. The process includes providing a structured surface and a hydrophilic surface treatment covalently bonded to at least a portion of the structured surface, and soiling the structured surface with a material. The process further includes removing the material by at least one of submerging the structured surface in an aqueous fluid, rinsing the structured surface with an aqueous fluid, condensing an aqueous fluid on the structured surface, or wiping the structured surface with a cleaning implement. At least 50% of a 2-dimensional projected area of the structured surface onto a plane is free of the material. The hydrophilic surface treatment typically includes functional groups selected from a non-zwitterionic sulfonate, a non-zwitterionic carboxylate, a zwitterionic sulfonate, a zwitterionic carboxylate, a zwitterionic phosphate, a zwitterionic phosphonic acid, a zwitterionic phosphonate, or a combination thereof. Preferably, at least 70%, or 80%, or 90%, or even 95% of the 2-dimensional projected area of the structured surface onto a plane is free of the material.

In certain embodiments, the material comprises an oil, such as an inorganic oil, an organic oil, or a combination thereof. Organic oils include for example and without limitation, a crude oil, an almond oil, a castor oil, a coconut oil, a soybean oil, a rapeseed oil, a cottonseed oil, a sunflower seed oil, a groundnut oil, a palm oil, a palm kernel oil, a sesame oil, a linseed oil, a maize oil, a coconut oil, a peanut oil, an olive oil, a hemp oil, a corn oil, a mustard oil, a flaxseed oil, an apricot oil, an argan oil, an avocado oil, a ben oil, a cashew oil, a grape seed oil, a hazelnut oil, a neem oil, a pumpkin seed oil, a rice bran oil, a walnut oil, a safflower oil, a copra oil, and combinations thereof. Inorganic oils include for example and without limitation, a silicone oil, a mineral oil, and combinations thereof.

The material is optionally a complex material, for instance comprising a mixture of a plurality of contaminants, and typically containing at least one hydrophobic material. Material soiling the structured material may be easily removed with an aqueous fluid consisting of water. If desired, one or more additional components can be included in the aqueous fluid, such as a zwitterionic material, a surfactant, biocides, fragrances, and/or other additives typically employed in cleaning solutions that do not affect fluid management performance.

Depending on the location of the structured surface (e.g., on a floor or wall), it may be convenient to rub the structured surface with a cleaning implement, such as a cloth or a mop. Wiping with a cleaning implement is often combined with submerging a structured surface, for instance by pouring a volume of aqueous fluid on the structured surface and wiping the fluid on the structured surface. When the structured surface is present in a difficult to reach location (e.g., on overhead pipes or a high ceiling), it may be convenient to rinse the structured surface with the aqueous fluid (e.g., spray aqueous fluid onto the surface) or to condense aqueous fluid out of a saturated atmosphere on the structured surface.

When the structured surface comprises a fluid control film (as disclosed in detail above), the fluid control film at least partially self-cleans when submerged in or rinsed with the aqueous fluid due to capillary action of the aqueous fluid by the fluid control film. For instance, in certain embodiments at least some self-cleaning via capillary rise of aqueous fluid may occur when just an edge of the fluid control film is submerged in the aqueous fluid. Hence, minimal force is required between the aqueous fluid and the fluid control film (i.e., structured surface) to effectively remove the material soiling the fluid control film. In certain embodiments in which the fluid control film has primary channels and secondary channels, for example, the aqueous fluid is used in an amount of 1 to 10 times the volume of aqueous fluid that would fill the secondary channels to remove the material. Advantageously, the fluid control film typically provides a capillary rise of water after removal of the material of at least 20%, or at least 40%, or at least 50%, or at least 55%, or at least 60%, or at least 70%, or at least 75%, or at least 80% of the capillary rise of water prior to the soiling of the fluid control film.

This maintenance of hydrophilicity and water capillarity following contamination and/or heat aging is advantageous in achieving a successful condensation management program due to potentially improving both the shelf life and performance lifetime of the product.

Various embodiments are described herein including the following items.

Item 1 is a fluid control film including a plurality of fluid control channels extending along a channel longitudinal axis, each of the fluid control channels having a surface and configured to allow capillary movement of liquid in the channels; and a hydrophilic surface treatment covalently bonded to at least a portion of the surface of the fluid control channels. The fluid control film exhibits a capillary rise percent recovery of at least 10%.

Item 2 is the fluid control film of item 1, wherein the fluid control channels have a depth of less than 500 micrometers.

Item 3 is the fluid control film of item 1 or item 2, wherein the hydrophilic surface treatment comprises a non-zwitterionic sulfonate, a non-zwitterionic carboxylate, a zwitterionic sulfonate, a zwitterionic carboxylate, a zwitterionic phosphate, a zwitterionic phosphonic acid, a zwitterionic phosphonate, or a combination thereof.

Item 4 is the fluid control film of any of items 1 to 3, wherein the hydrophilic surface treatment comprises a zwitterionic sulfonate-functional silane, a zwitterionic carboxylate-functional silane, a zwitterionic phosphate-functional silane, a zwitterionic phosphonic acid-functional silane, a zwitterionic phosphonate-functional silane, or a combination thereof.

Item 5 is the fluid control film of any of items 1 to 4, wherein the hydrophilic surface treatment comprises a zwitterionic silane having the following Formula (I):

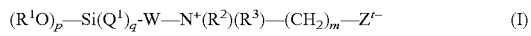

$(R^1O)_p-Si(Q^1)_q-W-N^+(R^2)(R^3)-(CH_2)_m-Z^{t-}$ (I)

In Formula (I), each $R^1$ is independently a hydrogen, methyl group, or ethyl group. In Formula (I), each $Q^1$ is independently selected from hydroxyl, alkyl groups containing from 1 to 4 carbon atoms, and alkoxy groups containing from 1 to 4 carbon atoms. In Formula (I), each $R^2$ and $R^3$ is independently a saturated or unsaturated, straight chain, branched, or cyclic organic group (preferably having 20 carbons or less), which may be joined together, optionally with atoms of the group W, to form a ring. In Formula (I), W is an organic linking group. In Formula (I), $Z^{t-}$ is $-SO_3^-$, $-CO_2^-$, $-OPO_3^{2-}$, $-PO_3^{2-}$, $-OP(=O)(R)O^-$, or a combination thereof, wherein t is 1 or 2, and R is an aliphatic, aromatic, branched, linear, cyclic, or heterocyclic group (preferably having 20 carbons or less, more preferably R is aliphatic having 20 carbons or less, and even more preferably R is methyl, ethyl, propyl, or butyl). In Formula (I), p and m are integers of 1 to 10 (or 1 to 4, or 1 to 3). In Formula (I), q is 0 or 1, and p+q=3.

Item 6 is the fluid control film of any of items 1 to 5, wherein the non-zwitterionic anionic silane comprises a non-zwitterionic sulfonic acid alcohol-functional silane, a non-zwitterionic EDTA-functional silane, or a combination thereof.

Item 7 is the fluid control film of any of items 1 to 6, wherein the hydrophilic surface treatment comprises a non-zwitterionic anionic silane having the following Formula (II):

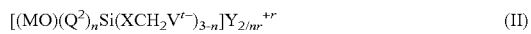

$[(MO)(Q^2)_nSi(XCH_2V^{t-})_{3-n}]Y_{2/nr}^{+r}$ (II)

In Formula (II), each $Q^2$ is independently selected from hydroxyl, alkyl groups containing from 1 to 4 carbon atoms, and alkoxy groups containing from 1 to 4 carbon atoms. In Formula (II), M is selected from hydrogen, alkali metals, and organic cations of strong organic bases having an average molecular weight of less than 150 and a pKa of greater than 11. In Formula (II), X is an organic linking group. In Formula (II), $V^{t-}$ is $-SO_3^-$, $-CO_2^-$, $-[OCH_2CH_2]nO^-$, or a combination thereof, wherein t is 1 or 2 and n is an integer of 1 to 10. In Formula (II), Y is selected from hydrogen, alkaline earth metals (e.g., magnesium, calcium, etc.), organic cations of protonated weak bases having an average molecular weight of less than 200 and a pKa of less than 11 (e.g., 4-aminopyridine, 2-methoxyethylamine, benzylamine, 2,4-dimethylimidazole, 3-[2-ethoxy(2-ethoxyethoxy)]propylamine), alkali metals, and organic cations of strong organic bases having an average molecular weight of less than 150 and a pKa of greater than 11 (e.g., $^+N(CH_3)_4$, $^+N(CH_2CH_3)_4$), provided that M is hydrogen when Y is selected from hydrogen, alkaline earth metals and organic cations of said protonated weak bases. In Formula (II), r is equal to the valence of Y; and n is 1 or 2.

Item 8 is the fluid control film of any of items 1 to 7, further including a siliceous primer disposed on at least a portion of the surface of the fluid control channels, wherein the hydrophilic surface treatment is bonded the surface of the microchannels via the siliceous primer.

Item 9 is the fluid control film of claim 8, wherein the siliceous primer includes a plurality of acid-sintered interconnected silica nanoparticles arranged to form a continuous three-dimensional porous network.

Item 10 is the fluid control film of item 8, wherein the siliceous primer comprises a silicon-containing material associatively attached to at least a portion of the surface of the fluid control channels.

Item 11 is the fluid control film of any of items 1 to 10, wherein the fluid control film exhibits a capillary rise percent recovery of at least 15%, or at least 20%, or at least 25%, or at least 30%, or at least 35%, or at least 40%, or at least 45%, or at least 50%, or at least 55%, or at least 60%, or at least 65%.

Item 12 is the fluid control film of any of items 1 to 11, wherein the plurality of fluid control channels include primary channels, each primary channel including first and second primary ridges having a height $h_p$.

Item 13 is the fluid control film of item 12, wherein the plurality of fluid control channels further include secondary channels disposed between the first and second primary ridges of the primary channels, each secondary channel associated with at least one secondary ridge having a height $h_s$, wherein $h_p > h_s$.

Item 14 is the fluid control film of any of items 1 to 13, wherein the plurality of fluid control channels are configured to provide a capillary force on a liquid in the channels that is greater than a gravitational force on the liquid.

Item 15 is the fluid control film of any of items 1 to 14, wherein the fluid control film provides a capillary rise of water after exposure to an elevated temperature of 150 degrees Fahrenheit (65.6 degrees Celsius) for four days of at least 15% of the capillary rise of water prior to the exposure to the elevated temperature.

Item 16 is the fluid control film of any of items 1 to 15, wherein the fluid control film provides a capillary rise of water after exposure to an elevated temperature of 150 degrees Fahrenheit (65.6 degrees Celsius) for four days of at least 20% of the capillary rise of water prior to the exposure to the elevated temperature.

Item 17 is the fluid control film of any of items 1 to 16, wherein the fluid control film provides a capillary rise of water after exposure to an elevated temperature of 150 degrees Fahrenheit (65.6 degrees Celsius) for four days of at least 25% of the capillary rise of water prior to the exposure to the elevated temperature.

Item 18 is the fluid control film of any of items 1 to 17, wherein the fluid control film provides a capillary rise of water after exposure to an elevated temperature of 150 degrees Fahrenheit (65.6 degrees Celsius) for four days of at least 35% of the capillary rise of water prior to the exposure to the elevated temperature.

Item 19 is the fluid control film of any of items 1 to 18, wherein the fluid control film provides a capillary rise of water after exposure to an elevated temperature of 150 degrees Fahrenheit (65.6 degrees Celsius) for four days of at least 40% of the capillary rise of water prior to the exposure to the elevated temperature.

Item 20 is the fluid control film of any of items 1 to 19, wherein the fluid control film provides a capillary rise of water after exposure to an elevated temperature of 150 degrees Fahrenheit (65.6 degrees Celsius) for four days of at least 50% of the capillary rise of water prior to the exposure to the elevated temperature.

Item 21 is the fluid control film of any of items 1 to 20, wherein the fluid control film provides a capillary rise of water after exposure to an elevated temperature of 150 degrees Fahrenheit (65.6 degrees Celsius) for four days of at least 55% of the capillary rise of water prior to the exposure to the elevated temperature.

Item 22 is the fluid control film of any of items 1 to 21, wherein the fluid control film is attached to an outer surface of a structure and extends along a longitudinal axis of the outer surface, and wherein the channel longitudinal axis makes an angle between 0 and 90 degrees with respect to the longitudinal axis of the outer surface.

Item 23 is the fluid control film of any of items 1 to 22, wherein the hydrophilic surface treatment further comprises at least one silicate.

Item 24 is the fluid control film of item 23, wherein the at least one silicate includes lithium silicate, sodium silicate, potassium silicate, silica, tetraethylorthosilicate, poly(diethoxysiloxane), or a combination thereof.

Item 25 is a process for forming a fluid control film including continuously bringing a flowable material and a molding surface of a molding tool into line contact with each other; forming a plurality of microchannels within the flowable material; solidifying the flowable material to form an elongated fluid control film, the fluid control film having a length along a longitudinal axis and a width, the length being greater than the width, wherein the microchannels are formed along a channel longitudinal axis; and covalently bonding a hydrophilic surface treatment to at least a portion of a surface of the microchannels, the hydrophilic surface treatment comprising functional groups selected from a non-zwitterionic sulfonate, a non-zwitterionic carboxylate, a zwitterionic sulfonate, a zwitterionic carboxylate, a zwitterionic phosphate, a zwitterionic phosphonic acid, a zwitterionic phosphonate, or a combination thereof.

Item 26 is the process of item 25, wherein the hydrophilic surface treatment comprises a zwitterionic silane.

Item 27 is the process of item 25 or item 26, wherein the hydrophilic surface treatment comprises a zwitterionic silane having the following Formula (I):

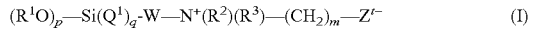

In Formula (I), each $R^1$ is independently a hydrogen, methyl group, or ethyl group. In Formula (I), each $Q^1$ is independently selected from hydroxyl, alkyl groups containing from 1 to 4 carbon atoms, and alkoxy groups containing from 1 to 4 carbon atoms. In Formula (I), each $R^2$ and $R^3$ is independently a saturated or unsaturated, straight chain, branched, or cyclic organic group (preferably having 20 carbons or less), which may be joined together, optionally with atoms of the group W, to form a ring. In Formula (I), W is an organic linking group. In Formula (I), $Z^{t-}$ is $-SO_3^-$, $-CO_2^-$, $-OPO_3^{2-}$, $-PO_3^{2-}$, $-OP(=O)(R)O^-$, or a combination thereof, wherein t is 1 or 2, and R is an aliphatic, aromatic, branched, linear, cyclic, or heterocyclic group (preferably having 20 carbons or less, more preferably R is aliphatic having 20 carbons or less, and even more preferably R is methyl, ethyl, propyl, or butyl). In Formula (I), p and m are integers of 1 to 10 (or 1 to 4, or 1 to 3). In Formula (I), q is 0 or 1; and p+q=3.

Item 28 is the process of any of items 25 to 27, wherein the non-zwitterionic anionic silane comprises a non-zwitterionic sulfonic acid alcohol-functional silane, a non-zwitterionic EDTA-functional silane, a non-zwitterionic phosphate-functional silane, a non-zwitterionic phosphonic acid-functional silane, or a combination thereof.

Item 29 is the process of any of items 25 to 28, wherein the hydrophilic surface treatment comprises non-zwitterionic anionic silane having the following Formula (II):

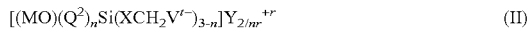

In Formula (II), each $Q^2$ is independently selected from hydroxyl, alkyl groups containing from 1 to 4 carbon atoms, and alkoxy groups containing from 1 to 4 carbon atoms. In Formula (II), M is selected from hydrogen, alkali metals, and organic cations of strong organic bases having an average molecular weight of less than 150 and a pKa of greater than 11. In Formula (II), X is an organic linking group. In Formula (II), $V^{t-}$ is $-SO_3^-$, $-CO_2^-$, $-[OCH_2CH_2]nO^-$, or a combination thereof, wherein t is 1 or 2 and n is an integer of 1 to 10. In Formula (II), Y is selected from hydrogen, alkaline earth metals (e.g., magnesium, calcium, etc.), organic cations of protonated weak bases having an average molecular weight of less than 200 and a pKa of less than 11 (e.g., 4-aminopyridine, 2-methoxyethylamine, benzylamine, 2,4-dimethylimidazole, 3-[2-ethoxy(2-ethoxyethoxy)]propylamine), alkali metals, and organic cations of strong organic bases having an average molecular weight of greater than 150 and a pKa of greater than 11 (e.g., $^+N(CH_3)_4$, $^+N(CH_2CH_3)_4$), provided that M is hydrogen when Y is selected from hydrogen, alkaline earth metals and organic cations of said protonated weak bases. In Formula (II), r is equal to the valence of Y; and n is 1 or 2.

Item 30 is the process of item 29, wherein the EDTA silane hydrophilic surface treatment is covalently bonded to at least a portion of the microchannels from an acidic solution.

Item 31 is the process of any of items 25 to 30, further including applying a siliceous primer to at least a portion of the surface of the plurality of microchannels, the hydrophilic surface treatment bonded to the surface of the microchannels via the siliceous primer.

Item 32 is the process of item 31, wherein the siliceous primer includes a plurality of acid-sintered interconnected silica nanoparticles arranged to form a continuous three-dimensional porous network.

Item 33 is the process of item 31 or 32, wherein applying the siliceous primer includes contacting at least a portion of the surface of the plurality of microchannels with a nanoparticle-containing coating composition, wherein the nanoparticle-containing coating composition includes an aqueous dispersion having a pH of less than 5 comprising silica nanoparticles having average particle diameters of 40 nanometers or less, and an acid having a pKa of less than or equal to 3.5; and drying the nanoparticle-containing coating composition to provide the siliceous primer on at least a portion of the surface of the plurality of microchannels.

Item 34 is the process of any of items 31 to 33, wherein the siliceous primer comprises a silicon-containing material associatively bonded to at least a portion of the plurality of microchannels.

Item 35 is the process of item 34, wherein applying the siliceous primer includes forming a layer of silicon-containing materials covalently bonded to at least a portion of the microchannels by plasma deposition.

Item 36 is the process of item 35, wherein the plasma deposition comprises a gaseous mixture of at least one silane-containing material and oxygen.

Item 37 is the process of any of items 25 to 36, further including attaching the fluid control film to an outer surface of a structure such that the fluid control film extends along a longitudinal axis of the outer surface, and wherein the channel longitudinal axis makes an angle between 0 and 90 degrees with respect to the longitudinal axis of the outer surface.

Item 38 is the process of any of items 25 to 37, wherein the fluid control film exhibits a capillary rise percent recovery of at least 10%, or at least 15%, or at least 20%, or at least 25%, or at least 30%, or at least 35%, or at least 40%, or at least 45%, or at least 50%, or at least 55%, or at least 60%, or at least 65%.

Item 39 is the process of any of items 25 to 38, wherein the hydrophilic surface treatment further includes at least one silicate.

Item 40 is the process of item 39, wherein the at least one silicate includes lithium silicate, sodium silicate, potassium silicate, silica, tetraethylorthosilicate, poly(diethyoxysiloxane), or a combination thereof.

Item 41 is a process for cleaning a structured surface including providing a structured surface and a hydrophilic surface treatment covalently bonded to at least a portion of the structured surface; soiling the structured surface with a material; and removing the material by at least one of submerging the structured surface in an aqueous fluid, rinsing the structured surface with an aqueous fluid, condensing an aqueous fluid on the structure surface, or wiping the structured surface with a cleaning implement; wherein at least 50% of a 2-dimensional projected area of the structured surface is free of the material.

Item 42 is the process of item 41, wherein at least 70% of the 2-dimensional projected area of the structured surface is free of the material.

Item 43 is the process of item 41 or item 42, wherein at least 90% of the 2-dimensional projected area of the structured surface is free of the material.

Item 44 is the process of any of items 41 to 43, wherein the hydrophilic surface treatment comprises functional groups selected from a non-zwitterionic sulfonate, a non-zwitterionic carboxylate, a zwitterionic sulfonate, a zwitterionic carboxylate, a zwitterionic phosphate, a zwitterionic phosphonic acid, a zwitterionic phosphonate, or a combination thereof.

Item 45 is the process of any of items 41 to 44, wherein the material includes an oil.

Item 46 is the process of any of items 41 to 45, wherein the material includes an organic oil.

Item 47 is the process of any of items 41 to 46, wherein the material includes a crude oil, an almond oil, a castor oil, a coconut oil, a soybean oil, a rapeseed oil, a cottonseed oil, a sunflower seed oil, a groundnut oil, a palm oil, a palm kernel oil, a sesame oil, a linseed oil, a maize oil, a coconut oil, a peanut oil, an olive oil, a hemp oil, a corn oil, a mustard oil, a flaxseed oil, an apricot oil, an argan oil, an avocado oil, a ben oil, a cashew oil, a grape seed oil, a hazelnut oil, a neem oil, a pumpkin seed oil, a rice bran oil, a walnut oil, a safflower oil, a copra oil, and combinations thereof.

Item 48 is the process of any of items 41 to 47, wherein the material includes an inorganic oil.

Item 49 is the process of any of items 41 to 48, wherein the material includes a silicone oil or a mineral oil.

Item 50 is the process of any of items 41 to 49, wherein the aqueous fluid includes a zwitterionic material.

Item 51 is the process of any of items 41 to 49, wherein the aqueous fluid consists of water.

Item 52 is the process of any of items 41 to 51, wherein the wiping with a cleaning implement includes wiping with a cloth or a mop.

Item 53 is the process of any of items 41 to 52, wherein the structured surface comprises a fluid control film.

Item 54 is the process of item 53, wherein the fluid control film provides a capillary rise of water after removal of the material of at least 20% of the capillary rise of water prior to the soiling of the fluid control film.

Item 55 is the process of item 53 or item 54, wherein the fluid control film provides a capillary rise of water after removal of the material of at least 40% of the capillary rise of water prior to the soiling of the fluid control film.

Item 56 is the process of any of items 53 to 55, wherein the fluid control film provides a capillary rise of water after removal of the material of at least 50% of the capillary rise of water prior to the soiling of the fluid control film.

Item 57 is the process of any of items 53 to 56, wherein the fluid control film provides a capillary rise of water after removal of the material of at least 60% of the capillary rise of water prior to the soiling of the fluid control film.

Item 58 is the process of any of items 53 to 57, wherein the fluid control film provides a capillary rise of water after removal of the material of at least 80% of the capillary rise of water prior to the soiling of the fluid control film.

Item 59 is the process of any of items 53 to 58, wherein the fluid control film at least partially self-cleans when submerged in or rinsed with the aqueous fluid due to capillary action of the aqueous fluid by the fluid control film.

Item 60 is the process of any of items 53 to 59, wherein the plurality of fluid control channels include primary channels, each primary channel comprising first and second primary ridges having a height $h_p$.

Item 61 is the process of item 60, wherein the plurality of fluid control channels further include secondary channels disposed between the first and second primary ridges of the primary channels, each secondary channel associated with at least one secondary ridge having a height $h_s$, wherein $h_p > h_s$.

Item 62 is the process of item 61, wherein the aqueous fluid is used in an amount of 1 to 10 times the volume of aqueous fluid that would fill the secondary channels to remove the material.

Item 63 is the process of any of items 41 to 62, wherein the hydrophilic surface treatment further includes at least one silicate.

Item 64 is the process of item 63, wherein the at least one silicate comprises lithium silicate, sodium silicate, potassium silicate, silica, tetraethylorthosilicate, poly(diethoxysiloxane), or a combination thereof.

EXAMPLES

Materials Used:

| Material | Description | Supplier |
| --- | --- | --- |
| 3-(Trihydroxysilyl)propyl methylphosphonate | Phosphonate silane, 42 wt. % monosodium salt solution in water | Sigma-Aldrich (St. Louis, MO) |
| Carboxyethylsilanetriol | Carboxylate silane, 25 wt. % sodium salt solution in water | Gelest Inc. (Morrisville, PA) |

-continued

| Material | Description | Supplier |
|---|---|---|
| N-(Trimethoxysilylpropyl)ethylene-diamine triacetic acid | EDTA silane, 45 wt. % trisodium salt in water | |
| 3-(trihydroxysilyl)-1-propanesulfonic acid | Sulfonic acid silane, 30-35 wt. % solution in water | |
| 2-[methoxy(polyethyleneoxy)6-9propyl]trimethoxysilane | PEG silane | |
| 3-(N,N-dimethylaminopropyl)trimethoxysilane | | |
| Glycidoxypropyltrimethoxysilane | | Sigma-Aldrich (St. Louis, MO) |
| Sodium sulfite | | |
| 1,4-butane sultone | | |
| $HNO_3$ | Nitric acid | EMD Millipore (Billerica, MA) |
| NaOH | Sodium hydroxide | Avantor Performance Materials (Center Valley, PA) |
| MeOH | Methanol | VWR International (Radnor, PA) |
| IPA | Isopropyl alcohol | |
| NALCO 1115 | Colloidal silica, 4 nm particle size, under trade designation "NALCO 1115" | Nalco Company (Naperville, IL) |
| NALCO 2329 | Colloidal silica, 75 nm particle size, under trade designation "NALCO 2329" | |
| DS-10 | sodium dodecylbenzenesulfonate, surfactant | Sigma-Aldrich (St. Louis, MO) |
| Texas Crude Oil | | Texas Raw Crude (Midland, TX) |
| Silicone Oil | S159-500 | Fischer Scientific (Pittsburgh, PA) |
| USP Swan Mineral Oil | | Obtained from local vendors |
| Planters Peanut Oil | | |

Preparation of Microchannel Fluid Control Film—Substrate A

Microchannel fluid control films were prepared by extrusion embossing a low density polyethylene polymer (DOW 955I, obtained from The Dow Chemical Company, Midland, Mich. under trade designation "DOW LDPE 955I") on to a cylindrical tool according to the process described in U.S. Pat. No. 6,372,323. The tool was prepared by diamond turning the pattern of grooves shown in FIG. 2B in negative relief. The grooves were cut at a helix angle of 80 degrees relative to the cylinder axis, producing films with channels oriented at 20 degrees relative to the longitudinal (down web) direction of the film. The polymer was melted in an extruder at 365° F. (185° C.) and passed through a die into a nip between the tool roll heated to 200° F. (93° C.) and smooth 70° F. (21.1° C.) backup roll using a nip pressure of 500 PSI. The extruder speed and tool rotation speed were adjusted to produce a film with an overall thickness of 290 micrometers.

Preparation of Microchannel Fluid Control Film—Substrate B

A hydrophilic coating bearing silane and siloxane groups was then applied to the film of Substrate A using a parallel plate capacitively coupled plasma reactor as described in U.S. Patent Publication 2007/0139451. The chamber has a powered electrode area of 22.7 ft² (2.5 m²). After placing the fluid transfer film on the powered electrode, the reactor chamber was pumped down to a base pressure of less than 1.3 Pa (10 mTorr). A mixture of hexamethyldisiloxane and oxygen ($O_2$) gas were flowed into the chamber at rates of 200 standard cubic centimeters per minute (SCCM) and 1000 SCCM, respectively. Treatment was carried out using a plasma enhanced chemical vapor deposition (CVD) method by coupling RF power into the reactor at a frequency of 13.56 MHz and an applied power of 7500 watts. Treatment time was controlled by moving the fluid transfer film through the reaction zone at a rate of 30 ft/min (9.1 m/min), resulting in an exposure time of 10 seconds. Following the initial treatment, the chamber was evacuated and $O_2$ gas was flowed into the chamber at a rate of 1500 SCCM. RF Power was coupled into the chamber at a frequency of 13.56 MHz and an applied power of 7500 watts. Treatment time was controlled by moving the fluid transport film through the reaction zone at a rate of 30 ft/min (9.1 m/min). Following the $2^{nd}$ treatment, the RF power and the gas supply were stopped and the chamber was returned to atmospheric pressure.

Preparation of Microchannel Fluid Control Film—Substrate C and Substrate D:

To prepare Substrate C and Substrate D, a hydrophilic coating bearing silica nanoparticles was then applied to the film prepared above (Substrate A) using a silica nanoparticle dispersion and a #4 Meyer rod then drying the coated substrates at 90° C. for 10 minutes. For Substrate C, the silica nanoparticle dispersion was NALCO 1115 diluted to 5 wt. % solids by adding deionized water and then pH adjusted to 2 via dropwise addition of 1M $HNO_3$. For Substrate D, the silica nanoparticle dispersion was a mixture of NALCO 1115 and NALCO 2329 (at a weight ratio of 70:30) diluted to 5 wt. % solids by adding deionized water and then pH adjusted to 2 via dropwise addition of 1M $HNO_3$.

Synthesis of Zwitterionic Silane

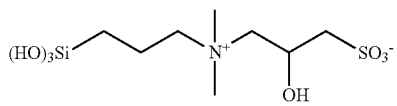

This molecule was prepared using a procedure described in US20120273000 by adding 49.7 g (239 mmol) of 3-(N, N-dimethylaminopropyl)trimethoxysilane to a screw top jar, adding 82.2 g of deionized water and 32.6 g (239 mmol) of 1,4-butane sultone to the same screw top jar and heating the mixture to 75° C. for 14 hours.

Synthesis of Sulfonic Acid Alcohol Silane

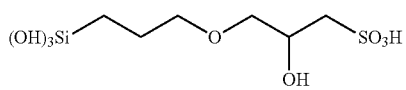

The sulfonic acid alcohol silane shown above was prepared using a procedure described in U.S. Pat. No. 4,235,638. A solution comprising 20 g glycidoxypropyltrimethoxysilane and 100 g of methanol was added slowly to a 1 L flask containing 10.8 g sodium sulfite and 208 g deionized water. The reaction mixture was stirred as the temperature was increased to 50° C. and held at that temperature for 17 hours. The resulting solution was a very slight yellow color.

Preparative Examples PE1-PE15

PE1-PE15 silane coating solutions were prepared by diluting the desired silane component to 2 wt. % using deionized (DI) water. If the silane was PEG silane, then the PEG silane was diluted to 2 wt. % using a 95/5 by wt. % IPA/DI water mixture instead of DI water alone. The solutions were either used as-diluted, or the pH was adjusted by the dropwise addition of either 1M $HNO_3$ or 1M NaOH to stirring silane solutions. The pH of each solution was measured using a VWR sympHony SB70P pH meter (obtained from VWR, Radnor, Pa.). Table 1, below summarizes the composition of silane coating solutions for each of PE1-PE15.

Examples 1-12 (EX1-EX12) and Comparative Examples A-I (CEA-CEI)

To prepare EX1-EX12 and CEE-CEI films, Substrate B-D films prepared as described above were submerged in a desired silane coating solution prepared as described above in PE1-PE15 for at least 48 hours. The substrate films were then removed from the coating solutions, rinsed with 600 mL/min running deionized water for 30 seconds, and allowed to dry under ambient conditions to prepare the silane coated films. CEA-CED samples were bare Substrates A-D, respectively (i.e., without a silane coating). Then, a 1"×1" (2.54 cm×2.54 cm) piece was cut from each of EX1-EX12 and CEA-CEI films. Texas crude oil was pipetted on top of the films such that the entire film surface was covered. The oil-coated film sample was then submerged in 100 mL of DI water for 3 minutes and removed. Upon removal, the fraction of the surface that was oil free was visually estimated. Table 2, below summarizes the type of substrate film, the silane used as well as the fraction (%) of the oil-free surface after the Texas crude oil test for each of EX1-EX12 and CEA-CEI.

TABLE 2

| Example | Substrate | Silane Coating Formulation | Silane Type | % of Surface that is Oil-Free |
|---|---|---|---|---|
| CEA | A | None | None | 0 |
| CEB | B | None | None | 0 |
| CEC | C | None | None | 5 |
| CED | D | None | None | 10 |
| CEE | B | PE8 | Phosphonate | 0 |
| CEF | B | PE9 | Phosphonate | 0 |
| CEG | B | PE10 | Carboxylate | 0 |
| CEH | B | PE12 | EDTA | 10 |
| CEI | B | PE15 | PEG | 0 |
| EX1 | B | PE1 | Zwitterionic | 100 |
| EX2 | C | PE1 | Zwitterionic | 90 |
| EX3 | D | PE1 | Zwitterionic | 95 |
| EX4 | B | PE2 | Zwitterionic | 95 |
| EX5 | B | PE3 | Zwitterionic | 90 |
| EX6 | B | PE4 | Sulfonic acid alcohol | 70 |
| EX7 | B | PE5 | Sulfonic acid alcohol | 80 |
| EX8 | B | PE13 | EDTA | 90 |
| EX9 | B | PE6 | Sulfonic acid | 25 |

TABLE 1

Type and Weight Fraction of Silane in Silane Coating Solution

| Example | Zwitterionic silane | Sulfonic acid alcohol silane | Sulfonic acid silane | Phosphonate silane | Carboxylate silane | EDTA silane | PEG silane | Solution pH | Acid/Base added |
|---|---|---|---|---|---|---|---|---|---|
| PE1 | 2 | | | | | | | 4.0 | None |
| PE2 | 2 | | | | | | | 1.5 | $HNO_3$ |
| PE3 | 2 | | | | | | | 10.0 | NaOH |
| PE4 | | 2 | | | | | | 1.3 | None |
| PE5 | | 2 | | | | | | 10.0 | NaOH |
| PE6 | | | 2 | | | | | 1.3 | None |
| PE7 | | | 2 | | | | | 10.0 | NaOH |
| PE8 | | | | 2 | | | | 10.4 | None |
| PE9 | | | | 2 | | | | 3.0 | $HNO_3$ |
| PE10 | | | | | 2 | | | 11.3 | None |
| PE11 | | | | | 2 | | | 3.0 | $HNO_3$ |
| PE12 | | | | | | 2 | | 11.7 | None |
| PE13 | | | | | | 2 | | 3.0 | $HNO_3$ |
| PE14 | | | | | | | 2 | 11.3 | None |
| PE15 | | | | | | | 2 | 1.7 | $HNO_3$ |

TABLE 2-continued

| Example | Substrate | Silane Coating Formulation | Silane Type | % of Surface that is Oil-Free |
|---|---|---|---|---|
| EX10 | B | PE7 | Sulfonic acid | 25 |
| EX11 | B | PE11 | Carboxylate | 15 |
| EX12 | B | PE14 | PEG | 15 |

Examples 13-17 (EX13-EX17) and Comparative Examples J-N (CEJ-CEN)

EX13-EX17 and CEJ-CEN samples were run to determine the capillary rise of water for EX1 and CEB films before and after they were exposed to contamination with one of mineral oil, peanut oil, silicone oil or crude oil. EX1 and CEB were chosen for these examples as EX1 had the best performance above in the easy clean performance (i.e., the largest % oil-free surface) test. Capillary rise was measured by determining the vertical height that water was transported on the EX1 and CEB films in two minutes before and after they were exposed to contamination with one of mineral oil, peanut oil, silicone oil or crude oil. Each measurement was repeated three times and the average along with the variation reported. Each sample was rinsed with deionized water and allowed to completely dry prior to the "after contamination" capillary height measurements. % Recovery, which is the percentage of capillary rise retained after contamination versus the capillary rise before contamination, was also determined. Capillary rise (aka capillary height) is believed to be an important performance parameter for the condensation management film applications where large capillary rise indicate extensive spreading/sheeting of water and consequently rapid evaporation of the water. Table 3, below summarizes the capillary rise data before and after contamination, the contaminant as well as the % Recovery for each of EX13-EX17 and CEJ-CEN.

TABLE 3

| Example | Substrate Film | Contaminant | Capillary Height (cm) | % Recovery |
|---|---|---|---|---|
| CEJ | CEB | None | 17.6 ± 0.8 | N/A |
| CEK | CEB | Mineral Oil | 15.2 ± 1.7 | 86 |
| CEL | CEB | Peanut Oil | 3.3 ± 0.1 | 19 |
| CEM | CEB | Silicone Oil | 0.5 ± 0.1 | 3 |
| CEN | CEB | Texas Crude oil | 0.9 ± 0.1 | 5 |
| EX13 | EX1 | None | 19.4 ± 0.7 | N/A |
| EX14 | EX1 | Mineral Oil | 17.5 ± 1.2 | 90 |
| EX15 | EX1 | Peanut Oil | 9.5 ± 1.0 | 49 |
| EX16 | EX1 | Silicone Oil | 10.4 ± 1.1 | 54 |
| EX17 | EX1 | Texas Crude oil | 4.7 ± 1.0 | 24 |

N/A means not applicable

Examples 18-19 (EX18-EX19) and Comparative Examples S-T (CEO-CEP)

EX18-EX19 and CEO-CEP samples were run to determine the capillary rise of water for EX1 and CEB films before and after they were heat aged at 150° F. for four days. EX1 and CEB were chosen for these examples as EX1 had the best performance above in the easy clean performance (i.e., the largest % oil-free surface) test. Capillary rise was measured by determining the vertical height that water was transported on the EX1 and CEB films in two minutes before and after they were exposed to heat aging at 150° F. for four days. Each measurement was repeated three times and the average along with the variation reported. % Recovery which is the percentage of capillary rise retained after heat aging versus the capillary rise before heat aging, was also determined. Table 4, below summarizes the capillary rise data before and after heat aging at 150° F. for four days as well as the % Recovery for each of EX18-EX19 and CEO-CEP.

TABLE 4

| Example | Substrate Film | Thermal Aging | Capillary Height (cm) | % Recovery |
|---|---|---|---|---|
| CEO | CEB | None | 21.7 ± 0.1 | N/A |
| CEP | CEB | 4 days at 150° F. | 2.0 ± 0.3 | 9 |
| EX18 | EX1 | None | 21.4 ± 0.6 | N/A |
| EX19 | EX1 | 4 days at 150° F. | 13.9 ± 1.4 | 65 |

N/A means not applicable

Particular materials and dimensions thereof recited in the disclosed examples, as well as other conditions and details, should not be construed to unduly limit this disclosure. Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims. Furthermore, all publications, published patent applications and issued patents referenced herein are incorporated by reference in their entirety to the same extent as if each individual publication or patent was specifically and individually indicated to be incorporated by reference.

What is claimed is:

1. A fluid control film comprising:
    a plurality of fluid control channels extending along a channel longitudinal axis, each of the fluid control channels comprising a surface and configured to allow capillary movement of liquid in the channels; and
    a hydrophilic surface treatment covalently bonded to at least a portion of the surface of the fluid control channels, wherein the hydrophilic surface treatment comprises functional groups selected from a non-zwitterionic sulfonate, a non-zwitterionic carboxylate, a zwitterionic sulfonate, a zwitterionic carboxylate, a zwitterionic phosphate, a zwitterionic phosphonic acid, a zwitterionic phosphonate, or a combination thereof, and wherein the fluid control film exhibits a capillary rise percent recovery of at least 10% wherein the capillary rise percent recovery is the percentage of capillary rise retained after contamination with silicone oil and subsequent cleaning with water versus the capillary rise before contamination, wherein the capillary rise is determined when the fluid control film is placed in a volume of water oriented perpendicular to the surface of the water with one edge having channel openings submerged below the water for two minutes and the vertical height of the transported water above the submerged edge is measured.

2. The fluid control film of claim 1, wherein the hydrophilic surface treatment comprises a zwitterionic silane having the following Formula (I):

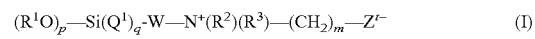

wherein:
    each $R^1$ is independently a hydrogen, methyl group, or ethyl group;

each $Q^1$ is independently selected from hydroxyl, alkyl groups containing from 1 to 4 carbon atoms, and alkoxy groups containing from 1 to 4 carbon atoms;

each $R^2$ and $R^3$ is independently a saturated or unsaturated, straight chain, branched, or cyclic organic group, which may be joined together, optionally with atoms of the group W, to form a ring;

W is an organic linking group;

$Z^{t-}$ is $-SO_3^-$, $-CO_2^-$, $-OPO_3^{2-}$, $-PO_3^{2-}$, $-OP(=O)(R)O^-$, or a combination thereof, wherein t is 1 or 2, and R is an aliphatic, aromatic, branched, linear, cyclic, or heterocyclic group;

p and m are integers of 1 to 10;

q is 0 or 1; and p+q=3.

3. The fluid control film of claim 1, wherein the hydrophilic surface treatment comprises a non-zwitterionic anionic silane having the following Formula (II):

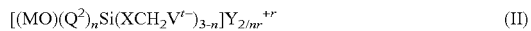
$$[(MO)(Q^2)_n Si(XCH_2V^{t-})_{3-n}]Y_{2/nr}^{+r} \qquad (II)$$

wherein:

each $Q^2$ is independently selected from hydroxyl, alkyl groups containing from 1 to 4 carbon atoms, and alkoxy groups containing from 1 to 4 carbon atoms;

M is selected from hydrogen, alkali metals, and organic cations of strong organic bases having an average molecular weight of less than 150 and a pKa of greater than 11;

X is an organic linking group;

$V^{t-}$ is $-SO_3^-$, $-CO_2^-$, $-[OCH_2CH_2]nO^-$, or a combination thereof, wherein t is 1 or 2 and n is an integer of 1 to 10;

Y is selected from hydrogen, alkaline earth metals, organic cations of protonated weak bases having an average molecular weight of less than 200 and a pKa of less than 11, alkali metals, and organic cations of strong organic bases having an average molecular weight of less than 150 and a pKa of greater than 11, provided that M is hydrogen when Y is selected from hydrogen, alkaline earth metals and organic cations of said protonated weak bases;

r is equal to the valence of Y; and n is 1 or 2.

4. The fluid control film of claim 1, further comprising a siliceous primer disposed on at least a portion of the surface of the fluid control channels, wherein the hydrophilic surface treatment is bonded the surface of the microchannels via the siliceous primer.

5. The fluid control film of claim 4, wherein the siliceous primer comprises a plurality of acid-sintered interconnected silica nanoparticles arranged to form a continuous three-dimensional porous network.

6. The fluid control film of claim 4, wherein the siliceous primer comprises a silicon-containing material associatively attached to at least a portion of the surface of the fluid control channels.

7. The fluid control film of claim 1, wherein the fluid control channels comprise a depth of less than 500 micrometers.

8. The fluid control film of claim 1, wherein the plurality of fluid control channels include primary channels, each primary channel comprising first and second primary ridges having a height $h_p$, and wherein the plurality of fluid control channels further comprise secondary channels disposed between the first and second primary ridges of the primary channels, each secondary channel associated with at least one secondary ridge having a height $h_s$, wherein $h_p > h_s$.

9. The fluid control film of claim 1, wherein the fluid control film provides a capillary rise of water after exposure to an elevated temperature of 150 degrees Fahrenheit (65.6 degrees Celsius) for four days of at least 20% of the capillary rise of water prior to the exposure to the elevated temperature.

10. The fluid control film of claim 1, wherein the fluid control film is attached to an outer surface of a structure and extends along a longitudinal axis of the outer surface, and wherein the channel longitudinal axis makes an angle between 0 and 90 degrees with respect to the longitudinal axis of the outer surface.

11. The fluid control film of claim 1, wherein the hydrophilic surface treatment comprises functional groups selected from a zwitterionic sulfonate, a zwitterionic carboxylate, a zwitterionic phosphate, a zwitterionic phosphonic acid, a zwitterionic phosphonate, or a combination thereof.

12. The fluid control film of claim 1, wherein the fluid control film exhibits a capillary rise percent recovery of at least 35%.

13. The fluid control film of claim 1, wherein the hydrophilic surface treatment further comprises at least one silicate.

* * * * *

UNITED STATES PATENT AND TRADEMARK OFFICE
CERTIFICATE OF CORRECTION

Page 1 of 2

PATENT NO. : 10,378,813 B2
APPLICATION NO. : 15/305524
DATED : August 13, 2019
INVENTOR(S) : Meuler et al.

It is certified that error appears in the above-identified patent and that said Letters Patent is hereby corrected as shown below:

In the Specification

Column 11,
Lines 45-48, delete "Each of the secondary channels 231 is associated with at least one secondary ridge 221. The secondary channels 231 may be located between a set of secondary ridges 221 or between a secondary ridge 221 and a primary ridge 220." and insert the same paragraph on Column 11 Line 44 as the continuation of the same paragraph.

Column 12,
Line 36, delete "to" and insert -- $t_a$ --, therefor.

Column 17,
Line 11, delete "ofpolyvinylacetate," and insert -- of polyvinylacetate, --, therefor.

Column 19,
Line 18, delete "CH₂CH—" and insert -- $CH_2$— --, therefor.

Column 19,
Line 55, delete " 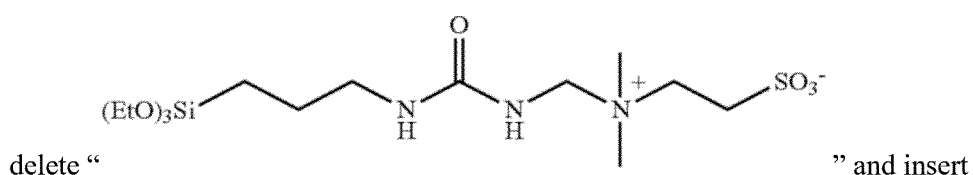 " and insert

Signed and Sealed this
Seventeenth Day of March, 2020

Andrei Iancu
*Director of the United States Patent and Trademark Office*

CERTIFICATE OF CORRECTION (continued)
U.S. Pat. No. 10,378,813 B2

-- 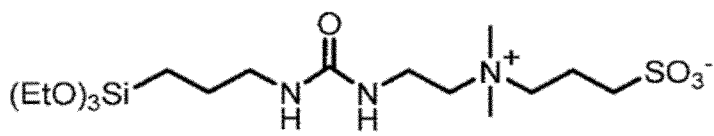 --, therefor.

Column 19,
Line 60, after " 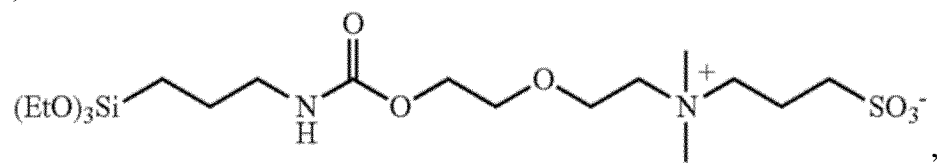 " insert -- . --.

In the Claims

Column 41,
Line 9, in Claim 2, delete "—$PO_3^2$-," and insert -- —$PO_3^{2-}$, --, therefor.